United States Patent
Seol et al.

(10) Patent No.: US 10,852,940 B2
(45) Date of Patent: Dec. 1, 2020

(54) MOBILE TERMINAL, AND METHOD FOR OPERATING SAME

(71) Applicant: LG ELECTRONICS INC., Seoul (KR)

(72) Inventors: Jie Seol, Seoul (KR); Bongjeong Jeon, Seoul (KR); Yongmun Gong, Seoul (KR); Beomsoo Kim, Seoul (KR); Yoonseok Jeong, Seoul (KR); Hyungjin Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/325,680

(22) PCT Filed: Jan. 12, 2017

(86) PCT No.: PCT/KR2017/000410
§ 371 (c)(1),
(2) Date: Feb. 14, 2019

(87) PCT Pub. No.: WO2018/034396
PCT Pub. Date: Feb. 22, 2018

(65) Prior Publication Data
US 2019/0235748 A1  Aug. 1, 2019

(30) Foreign Application Priority Data

Aug. 18, 2016  (KR) .................... 10-2016-0104614

(51) Int. Cl.
*G06F 3/0488*  (2013.01)
*H04N 5/232*  (2006.01)
(Continued)

(52) U.S. Cl.
CPC ........ *G06F 3/04883* (2013.01); *G06F 3/0481* (2013.01); *G06F 3/0482* (2013.01);
(Continued)

(58) Field of Classification Search
CPC ............. G06F 3/04883; G06F 3/04845; G06F 3/0483; G06F 3/0482
See application file for complete search history.

(56) References Cited

U.S. PATENT DOCUMENTS

2005/0246642 A1* 11/2005 Valderas ............... G06F 3/0481
715/730
2009/0031351 A1  1/2009 Kim
(Continued)

FOREIGN PATENT DOCUMENTS

KR  10-2007-0117952 A  12/2007
KR  10-2013-0022098 A  3/2013
(Continued)

OTHER PUBLICATIONS

Hamster Beat, "Photosephere HD Live Wallpaper," URL:https://www.youtube.com/watch?=yOBWQ3Rgk48, Jun. 25, 2013, 3 pages.

*Primary Examiner* — Seth A Silverman
(74) *Attorney, Agent, or Firm* — Birch, Stewart, Kolasch & Birch, LLP

(57) ABSTRACT

A mobile terminal according to one embodiment of the present disclosure includes a display unit configured to display a home screen including a background screen and an item screen superimposed on the background screen, and a controller configured to, when a clean view entry request is received, remove the item screen and reproduce an omnidirectional moving image set as an image of the background screen in response to the received clean view entry request.

14 Claims, 32 Drawing Sheets

(51) Int. Cl.

| | |
|---|---|
| *H04M 1/725* | (2006.01) |
| *G06F 3/0481* | (2013.01) |
| *G06F 3/0484* | (2013.01) |
| *H04N 5/93* | (2006.01) |
| *G06F 3/0482* | (2013.01) |
| *G06F 3/0483* | (2013.01) |

(52) U.S. Cl.
CPC .......... *G06F 3/0483* (2013.01); *G06F 3/0484* (2013.01); *G06F 3/0488* (2013.01); *G06F 3/04845* (2013.01); *H04M 1/725* (2013.01); *H04N 5/232* (2013.01); *H04N 5/93* (2013.01)

(56) References Cited

U.S. PATENT DOCUMENTS

| | | | |
|---|---|---|---|
| 2010/0295789 A1* | 11/2010 | Shin | G06F 3/0486 345/168 |
| 2013/0222288 A1* | 8/2013 | Lim | G06F 3/041 345/173 |
| 2014/0062860 A1* | 3/2014 | Lee | G06F 1/1694 345/156 |
| 2014/0149943 A1 | 5/2014 | Zhang | |
| 2016/0132991 A1 | 5/2016 | Fukushi | |
| 2018/0121069 A1* | 5/2018 | DiVerdi | G06F 3/04847 |

FOREIGN PATENT DOCUMENTS

| | | |
|---|---|---|
| KR | 10-2014-0055513 A | 5/2014 |
| KR | 10-2016-0021706 A | 2/2016 |

* cited by examiner

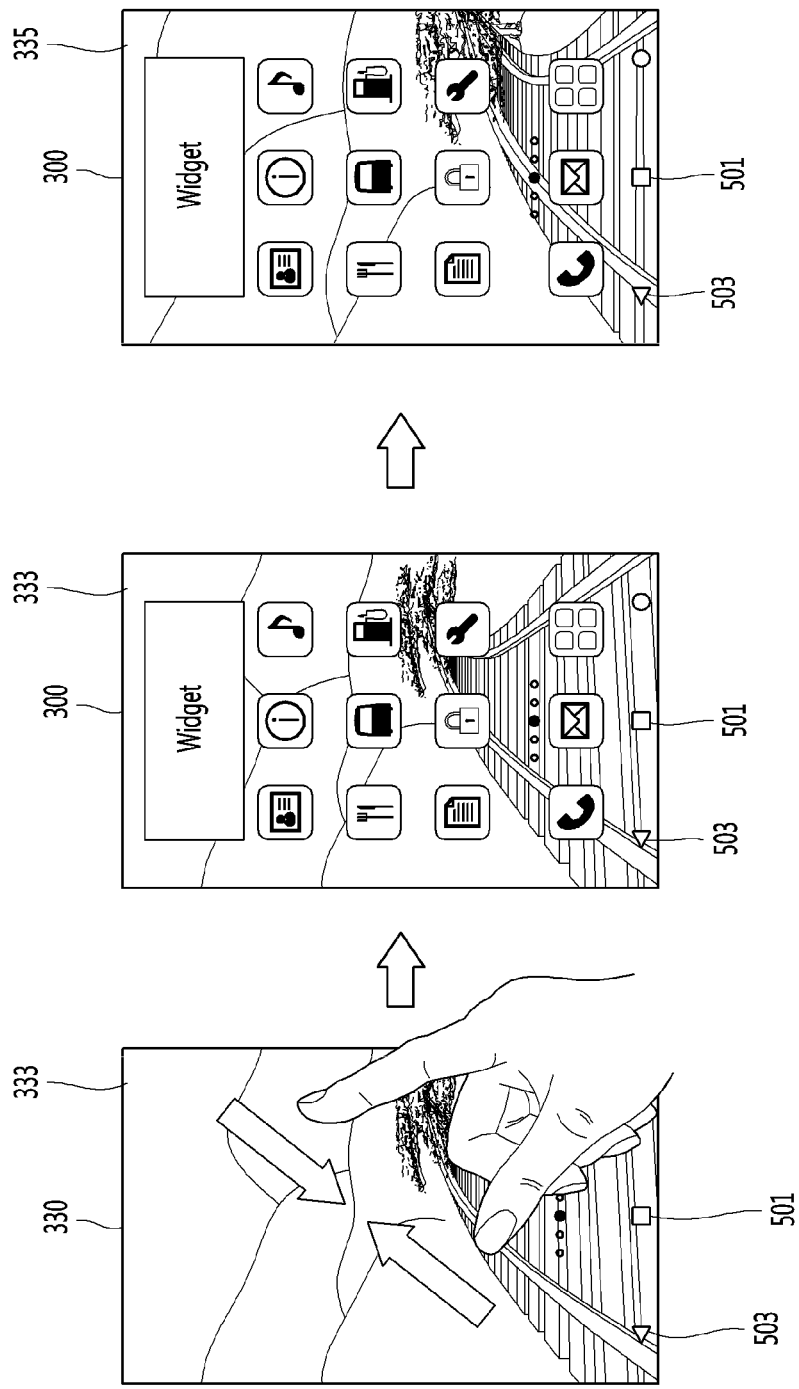

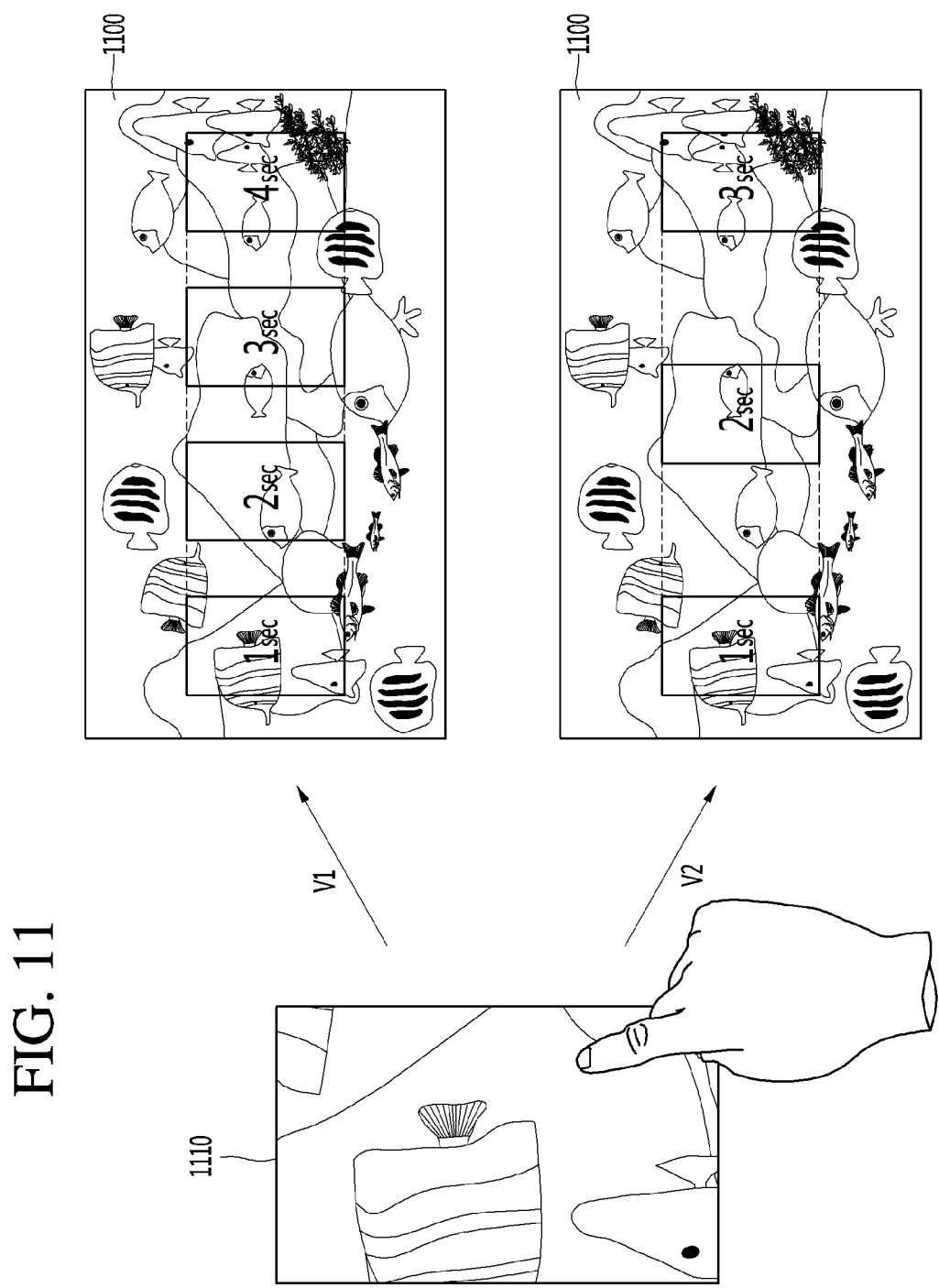

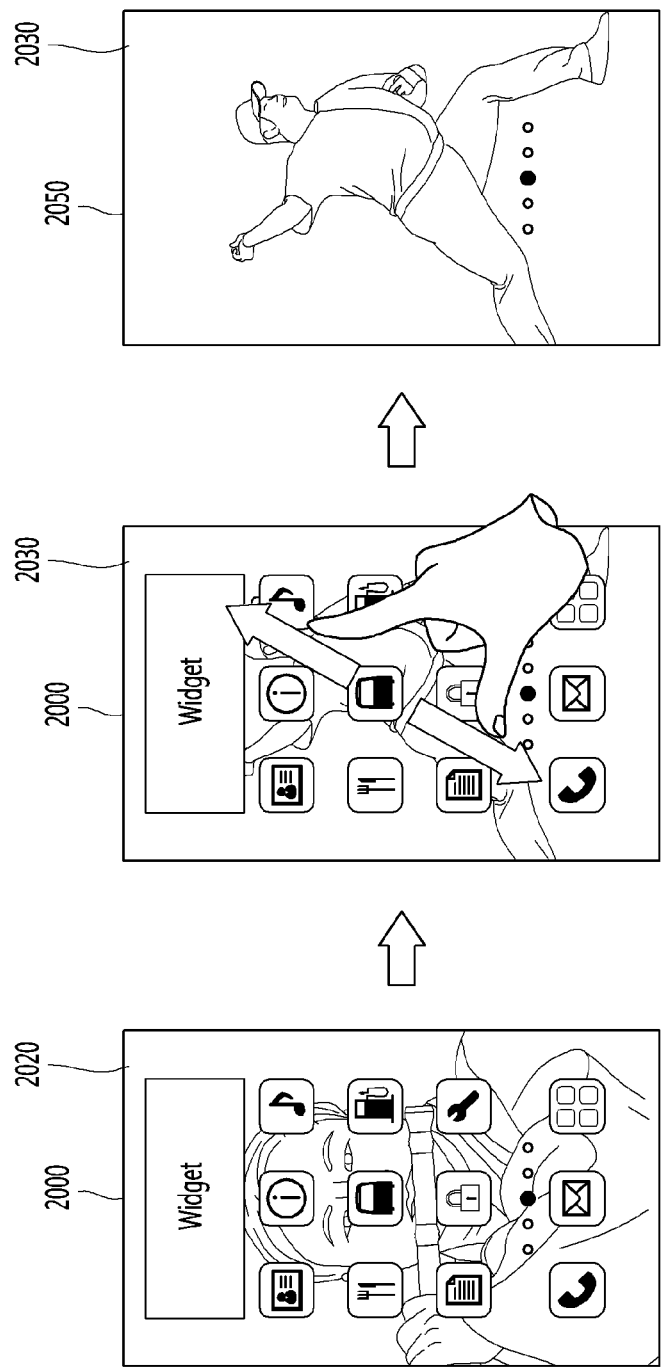

MOBILE TERMINAL, AND METHOD FOR OPERATING SAME

CROSS REFERENCE TO RELATED APPLICATIONS

This application is the National Phase of PCT International Application No. PCT/KR2017/000410, filed on Jan. 12, 2017, which claims priority under 35 U.S.C. 119(a) to Patent Application No. 10-2016-0104614, filed in the Republic of Korea on Aug. 18, 2016, all of which are hereby expressly incorporated by reference into the present application.

TECHNICAL FIELD

The present disclosure relates to a mobile terminal, and more particularly, a mobile terminal capable of utilizing a background of a home screen of the mobile terminal as an omni-directional moving image.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Efforts are ongoing to support and increase the functionality of mobile terminals. Such efforts include software and hardware improvements, as well as changes and improvements in the structural components.

Meanwhile, two-dimensional images and omni-directional images indicating omni-directional background are used in the background of the home screen of the mobile terminal.

However, an image having a predetermined reproduction section, such as an omni-directional moving image, cannot be utilized, and there is a limitation in the content used as the image of the background screen.

DISCLOSURE OF THE INVENTION

Technical Problem

The present disclosure has been made in an effort to solve the above-described problems and other problems.

Another object of the present disclosure is to provide a mobile terminal capable of utilizing an omni-directional moving image as a background of a home screen of the mobile terminal, and an operating method thereof.

Further another object of the present disclosure is to provide a mobile terminal for setting an omni-directional moving image as a background of a home screen in an easy and quick manner, and an operating method thereof.

Still further object of the present disclosure is to provide a mobile terminal capable of capable of quickly accessing and utilizing an omni-directional moving image through a background of a home screen, and an operating method thereof.

Technical Solution

According to one embodiment of the present disclosure, a mobile terminal includes: a display unit configured to display a home screen including a background screen and an item screen superimposed on the background screen; and a controller configured to, when a clean view entry request is received, remove the item screen and reproduce an omni-directional moving image set as an image of the background screen in response to the received clean view entry request.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

Advantageous Effects

According to various embodiments of the present disclosure, the user can access the omni-directional moving image in an easy manner by utilizing the omni-directional moving image as the background of the home screen of the mobile terminal.

In addition, the user can set the omni-directional moving image as the background of the home screen in an easy and quick manner.

In addition, the user can switch the home screen to the reproduction screen of the omni-directional moving image just by a simple operation.

BRIEF DESCRIPTION OF THE DRAWINGS

FIG. 5 is a view for describing an example of setting a still image of an omni-directional moving image corresponding to a stop time point as an image of a background screen in response to a reproduction stop request of an omni-directional moving image being reproduced on a background screen.

FIG. 11 is a view for describing that a scroll speed of an omni-directional image is different based on a speed of a drag input for an omni-directional image in accordance with an embodiment of the present disclosure.

FIGS. 20A and 20B are views for describing an example of utilizing information about a channel as an omni-directional image of a background screen in accordance with an embodiment of the present disclosure.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
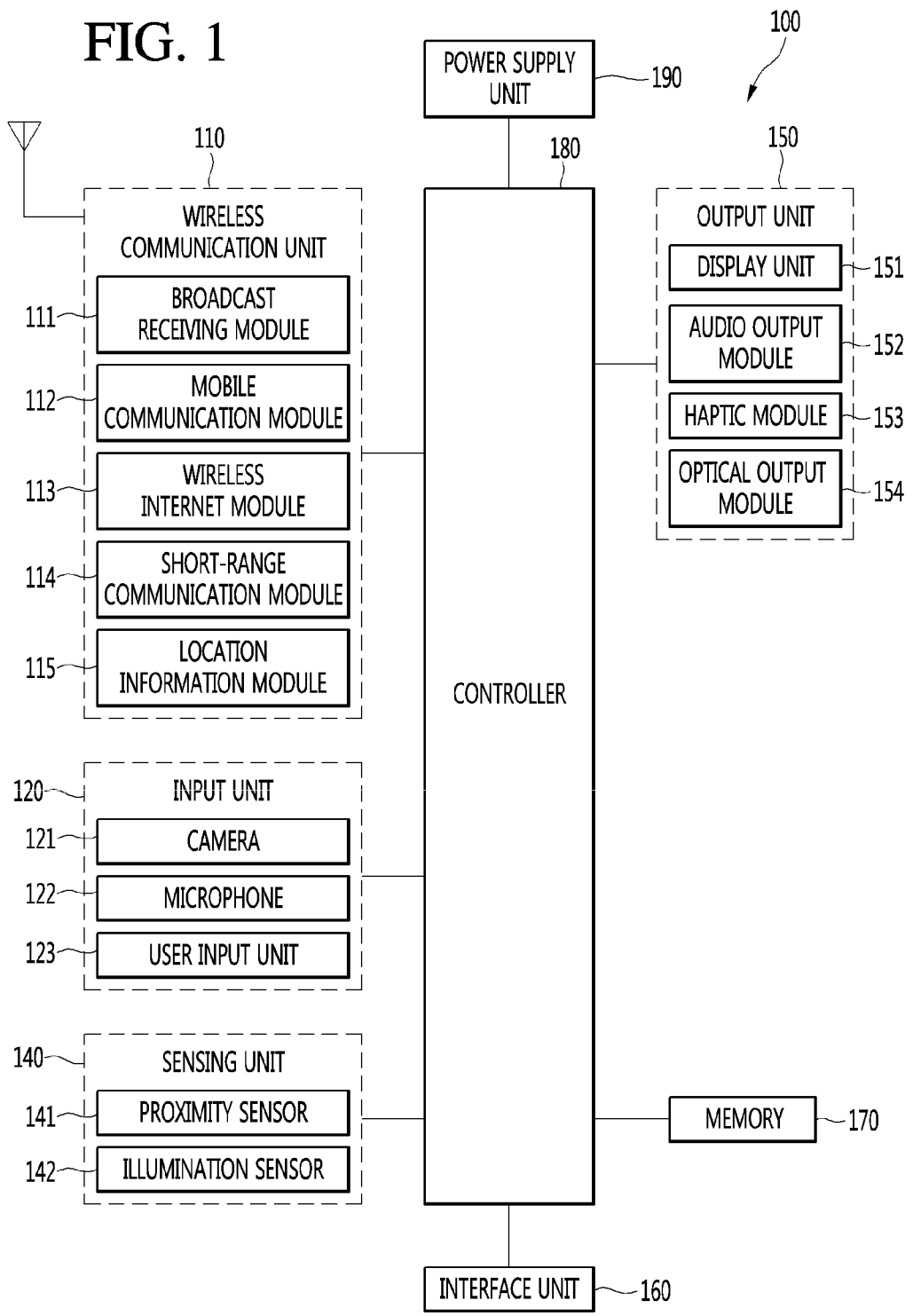
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170.

As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels. The broadcast managing entity may be a server which generates and transmits a broadcast signal and/or broadcast associated information, or a server which receives a pre-generated broadcast signal and/or broadcast associated information, and sends such items to the mobile terminal.

The broadcast signal may be implemented using any of a TV broadcast signal, a radio broadcast signal, a data broadcast signal, and combinations thereof, among others.

The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A(Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, Or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

A communication system which is operable with the variously described mobile terminals will now be described in more detail.

Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1 is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1, the mobile terminal may be configured to include short-range communication techniques such as Bluetooth™, Radio Frequency Identification (RFID), Infrared Data Association (IrDA), UltraWideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e.g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Hereinafter, an operating method of a mobile terminal in accordance with an embodiment of the present disclosure will be described.

Figure 2:
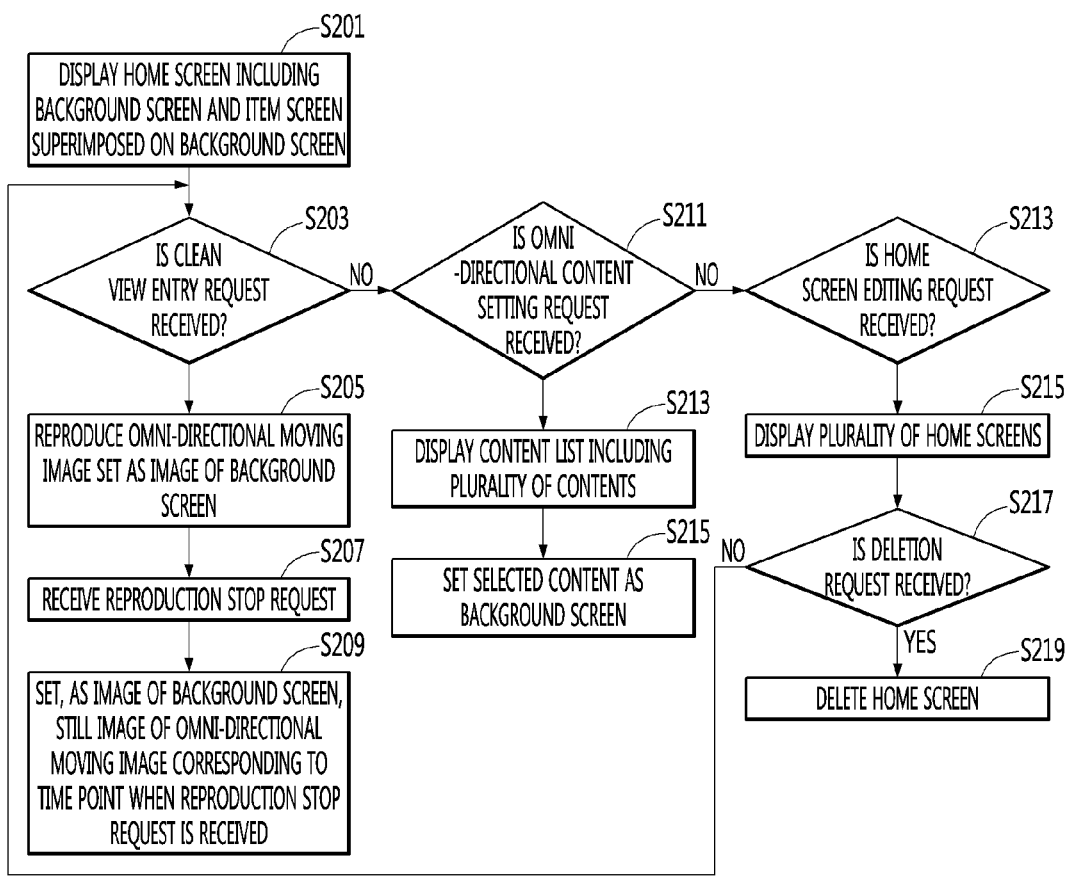
FIG. 2 is a flowchart of an operating method of a mobile terminal in accordance with an embodiment of the present disclosure.

FIG. 2 is a flowchart of an operating method of a mobile terminal in accordance with an embodiment of the present disclosure.

Referring to FIG. 2, the controller 180 of the mobile terminal 100 displays, on the display unit 151, a home screen including a background screen and an item screen superimposed on the background screen (S201).

In one embodiment, the home screen may include a background screen forming a background, a plurality of application icons, a widget, and the like.

The background screen and the item screen may be distinguished from each other, and may be independently edited or controlled.

One of omni-directional content and a two-dimensional (2D) image may be displayed on the background screen. The omni-directional content may be any one of an omni-directional moving image or an omni-directional image obtained from an omni-directional imaging apparatus that captures an image in all directions.

The omni-directional imaging apparatus may include a front camera and a rear camera. Each of the front camera and the rear camera may include a fisheye lens having an angle of view of 180 degrees or more. Each of the front camera and the rear camera can capture an omni-directional background through the fisheye lens. The omni-directional imaging apparatus can synthesize two partial images obtained through the fisheye lenses in a spherical shape to generate an omni-directional image. The generated omni-directional image can be transmitted to the mobile terminal 100.

The omni-directional content may include spherical images. The omni-directional content may be referred to as 360-degree content.

Then, when a clean view entry request is received (S203), the controller 180 reproduces the omni-directional moving image set as the image of the background screen (S205).

In one embodiment, the clean view entry request may be a request for displaying only the background screen included in the home screen. That is, the clean view entry request may be a request for removing the item screen included in the home screen and leaving only the background screen. The item screen may not be displayed on the display unit 151 according to the clean view entry request.

The screen displayed according to the clean view entry request may be referred to as the clean view screen.

In one embodiment, the controller 180 may reproduce the omni-directional moving image having a predetermined reproduction section in response to the clean view entry request. That is, before the clean view entry request is received, an image corresponding to a specific time point of the omni-directional moving image may be displayed on the background screen. The specific time point may be a time point at which the reproduction of the omni-directional moving image is stopped, but this is only an example.

In one embodiment, the controller 180 may reproduce the omni-directional moving image from the specific time point according to the clean view entry request.

In one embodiment, the clean view entry request may be a pinch-out request. The pinch-out request may be a request in which two touch inputs move from inside to outside at the same time. The pinch-out request is merely an example, and the clean view entry request may be received based on another touch input.

The controller 180 receives a reproduction stop request during the reproduction of the omni-directional moving image (S207), stops the reproduction of the omni-directional moving image in response to the received reproduction stop request, and sets a still image corresponding to the stopped time point as the image of the background screen (S209).

The controller 180 may stop the reproduction of the omni-directional moving image in response to the reproduction stop request when the reproduction stop request is received while the omni-directional content is being reproduced through the display unit 151. Accordingly, a part of the still image corresponding to the time point when the reproduction is stopped may be displayed through the display unit 151.

The still image corresponding to the time point when the reproduction is stopped may be an omni-directional image corresponding to a specific time point of the omni-directional moving image.

In one embodiment, the reproduction stop request may be a pinch-in request. The pinch-in request can be a request in which two touch inputs are directed from outside to inside at the same time. As the reproduction stop request, the pinch-in request has been described as an example, but this is merely an example, and the reproduction stop request may be received based on another touch input.

Steps S201 to S209 will be described in detail with reference to the following drawings.

Figure 3:
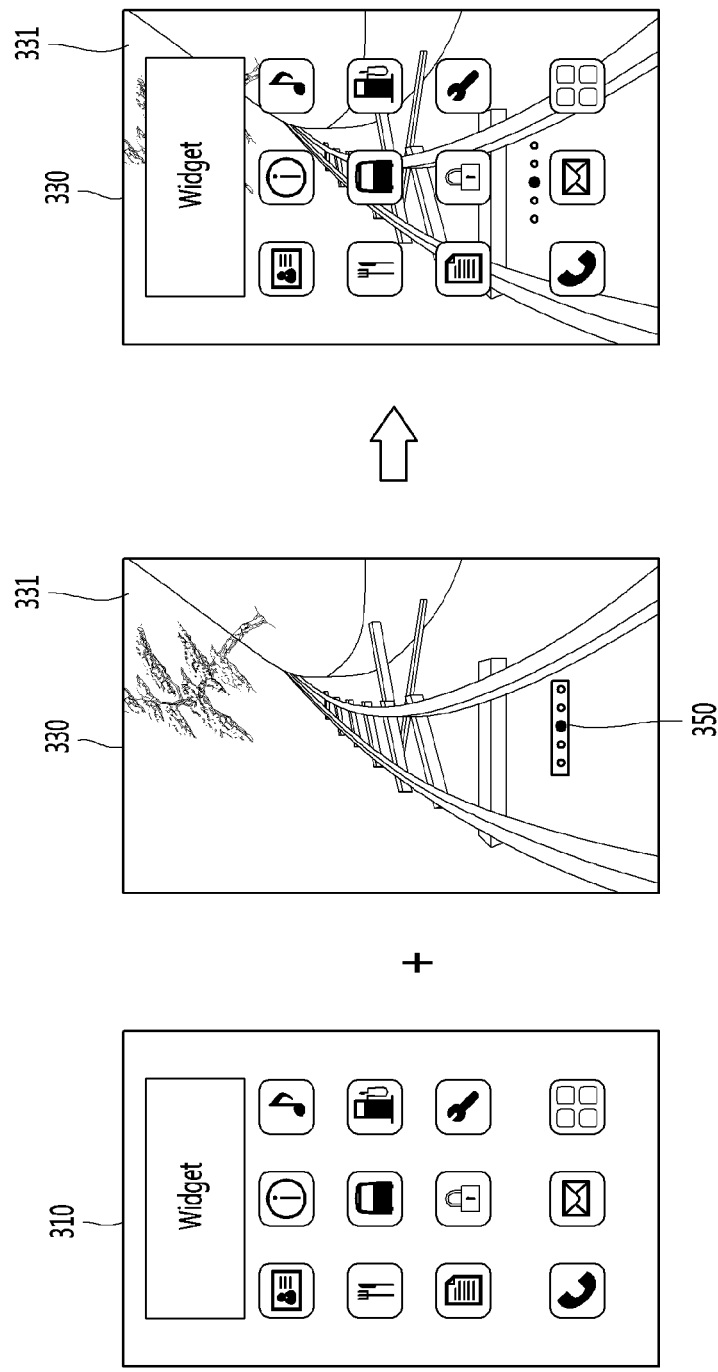
FIG. 3 is a view for describing a configuration of a home screen in accordance with an embodiment of the present disclosure.

FIG. 3 is a view for describing a configuration of a home screen in accordance with an embodiment of the present disclosure.

Referring to FIG. 3, a home screen 300 displayed through the display unit 151 of the mobile terminal 100 may include an item screen 310 and a background screen 330.

The home screen 300 may be displayed by selecting a physical home button (not shown) provided on the mobile terminal 100 or a home button icon (not shown) displayed on the display unit 151.

A plurality of application icons and widgets corresponding to a plurality of applications installed on the mobile terminal 100 may be displayed on the item screen 310.

A partial image 331 of a first omni-directional image corresponding to a first reproduction time point of an omni-directional moving image may be displayed on the background screen 330. The partial image 331 of the first omni-directional image corresponding to the first reproduction time point may be a part of the omni-directional image corresponding to a specific reproduction time point of the omni-directional moving image.

In addition, a page indicator group 350 indicating the position of the home screen currently displayed through the display unit 151 may be further displayed on the background screen 330. That is, the home screen may include a plurality of home screens, and the home screen may be switched according to a flicking input. Each of the plurality of home screens may correspond to each of a plurality of page indicators included in the page indicator group 350.

The item screen 310 may be displayed while being superimposed on the background screen 330. The background screen 330 and the item screen 310 superimposed on the background screen 330 may constitute a single home screen 300.

Figure 4:
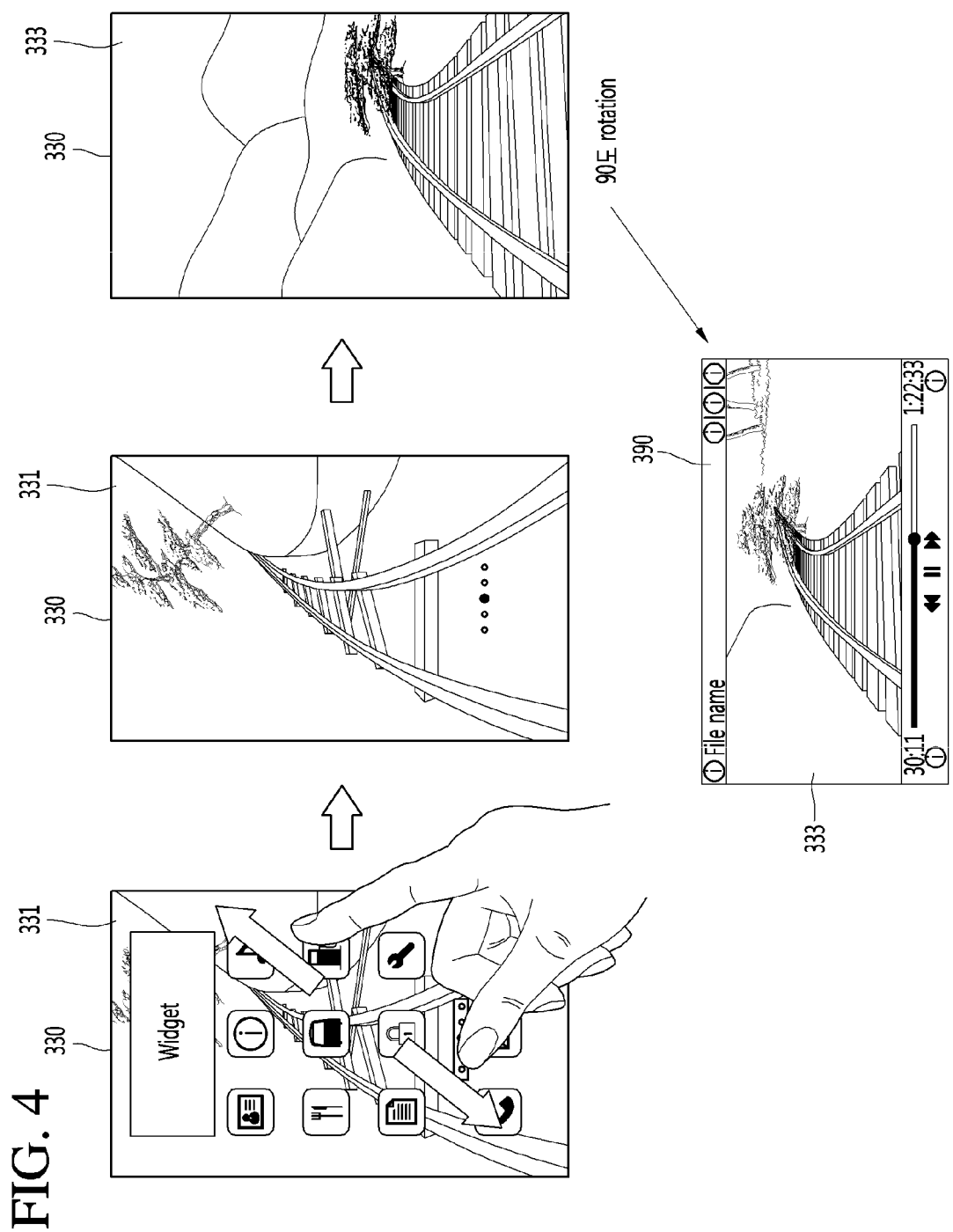
FIG. 4 is a view for describing an example of reproducing an omni-directional moving image displayed on a background screen in response to a clean view entry request.

FIG. 4 is a view for describing an example of reproducing an omni-directional moving image displayed on a background screen in response to a clean view entry request.

FIG. 4 is a screen displayed through the display unit 151 of the mobile terminal 100.

Hereinafter, in some cases, reference numerals of the item screen and the background screen are omitted.

Referring to FIG. 4, a home screen 300 including an item screen and a background screen is displayed.

In this state, when the clean view entry request is received, the controller 180 performs control such that the item screen 310 is removed and only the background screen 330 is displayed. The clean view entry request may be a pinch-out request.

The controller 180 may display only the background screen 330 in response to the clean view entry request and reproduce the omni-directional moving image on the background screen 330. Accordingly, the partial image 331 of the first omni-directional image corresponding to the first reproduction time point may be switched to the partial image 333 of the second omni-directional image corresponding to the second reproduction time point.

Meanwhile, the controller 180 may detect 90-degree rotation of the mobile terminal 100 through a gyro sensor or an acceleration sensor. Specifically, the controller 180 may detect that the display unit is switched from a portrait mode to a landscape mode.

When the mobile terminal 100 is rotated by 90 degrees, the controller 180 may execute a video application and reproduce an omni-directional moving image on an execution screen 390 of the video application. A user may view the omni-directional moving image through the video application and operate the omni-directional moving image.

FIG. 5 is a view for describing an example of setting a still image of an omni-directional moving image corresponding to a stop time point as an image of a background screen in response to a reproduction stop request of an omni-directional moving image being reproduced on a background screen.

The embodiment of FIG. 5 may be a process which is performed prior to an execution of a video player application in the embodiment of FIG. 4.

Referring to FIG. 5, the omni-directional moving image is reproduced through the display unit 151.

While the omni-directional moving image is being reproduced on the background screen 330, the controller 180 may receive a reproduction stop request. The reproduction stop request may be a pinch-in request, but the present disclosure is not limited thereto. The reproduction stop request may be a home button icon (not shown), a physical reverse button (not shown), a home button icon 501 displayed on the display unit 151, and a reverse icon 503, which are provided in the mobile terminal 100.

The controller 180 may stop the reproduction of the omni-directional moving image in response to the reproduction stop request. The controller 180 may set the still image of the omni-directional moving image, which corresponds to the time point when the reproduction is stopped, as the image of the background screen included in the home screen 300. The still image may be the partial image 333 of the second omni-directional image described with reference to FIG. 4.

That is, the controller 180 may automatically register the second omni-directional image corresponding to the time point when the reproduction is stopped as the image of the background screen. Accordingly, the partial image 333 of the second omni-directional image may be displayed on the background screen. At the same time, the controller 180 may display the item screen. That is, the controller 180 may register the second omni-directional image as the background screen and display the home screen 300 including the item screen and the background screen.

On the other hand, the partial image 333 included in the second omni-directional image displayed on the background screen may be switched to another partial image 335 included in the second omni-directional image after a predetermined time elapses.

The user can quickly set the image of the background screen to a desired image through a simple operation.

On the other hand, the function of setting an image to be displayed on the background screen 330 may be referred to as a wallpaper function.

Again, FIG. 2 is described.

On the other hand, when an omni-directional content setting request is received (S211), the controller 180 displays a content list including a plurality of contents in response to the omni-directional content setting request (S213).

In one embodiment, the controller 180 may display a content setting screen in response to the omni-directional content setting request. The content setting screen may include a spherical preview region and a content list display region.

The preview region may be a region for displaying a preview image of selected content when any one of the plurality of contents displayed in the content list region is selected.

The content list region may be a region for providing the content list including the plurality of contents. Each of the plurality of contents may be any one of an omni-directional moving image and an omni-directional image.

The plurality of contents may be stored in the memory 170 of the mobile terminal 100. The plurality of contents may be stored in a folder of a gallery application.

In one embodiment, the omni-directional content setting request may be a pinch-in request inputted on the home screen including the item screen and the background screen.

The controller 180 sets the selected omni-directional content as the background screen in response to a request for selecting one of the plurality of omni-directional contents (S215).

Steps S211 to S215 will be described with reference to the following drawings.

Figure 6A:
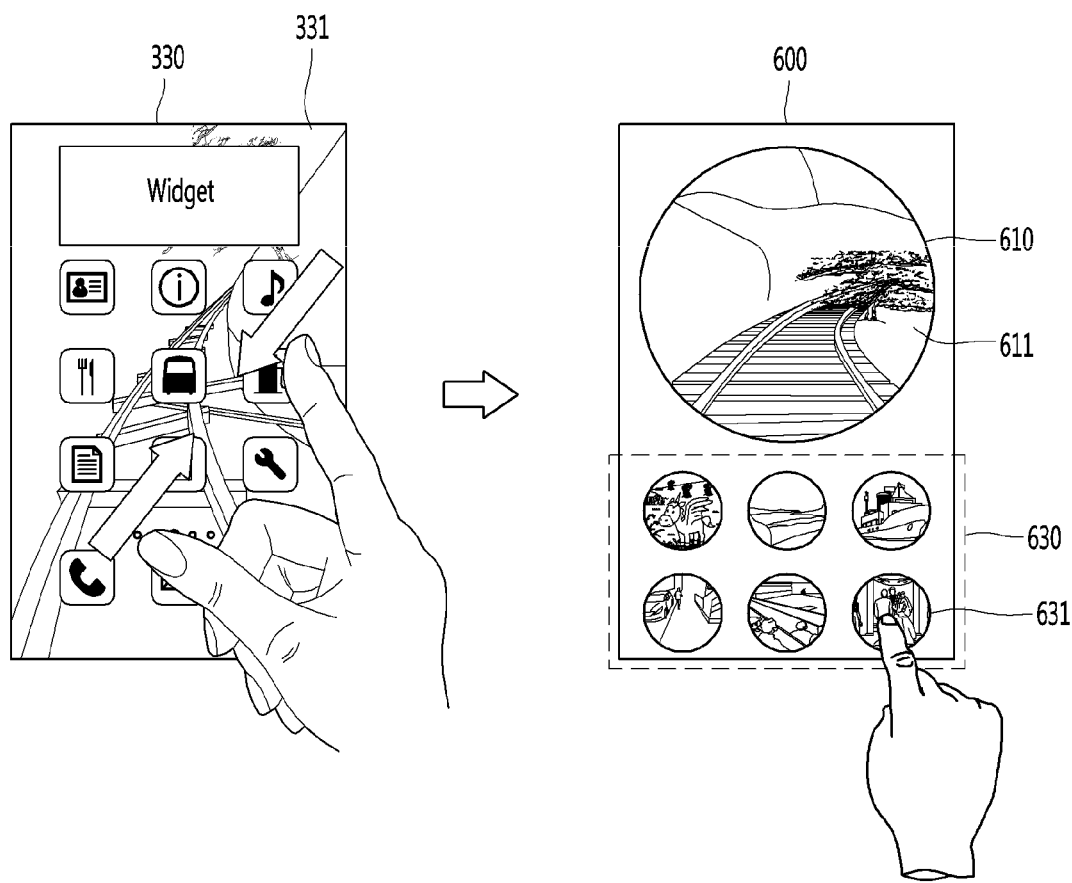
FIGS. 6A to 7 are views for describing a process of setting content of a background screen through an omni-directional content setting request in accordance with an embodiment of the present disclosure.
Figure 6B:
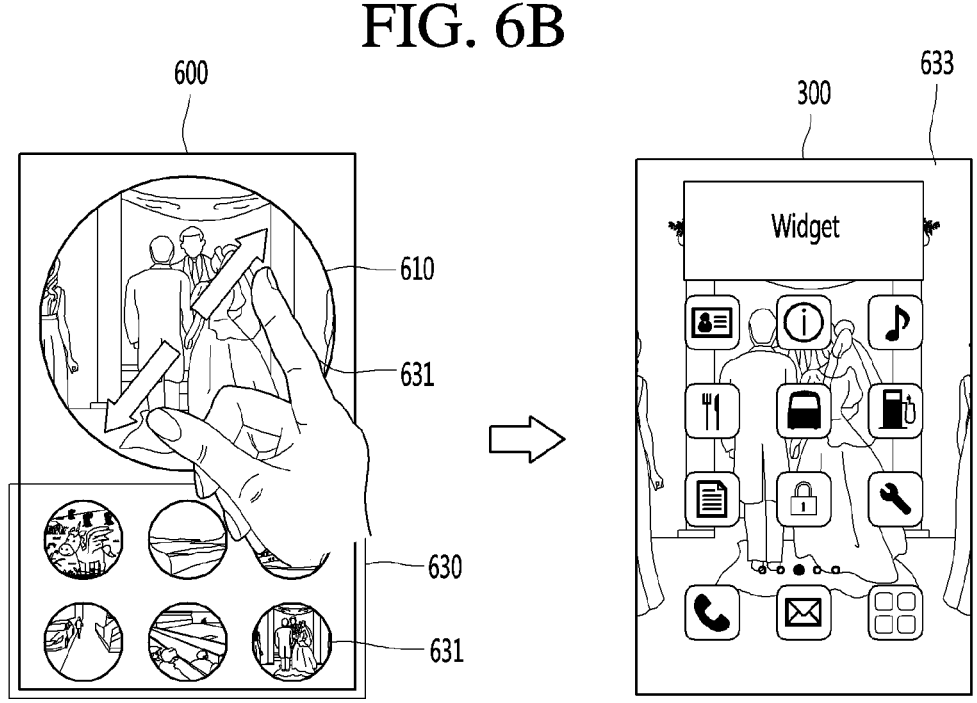
Figure 7:
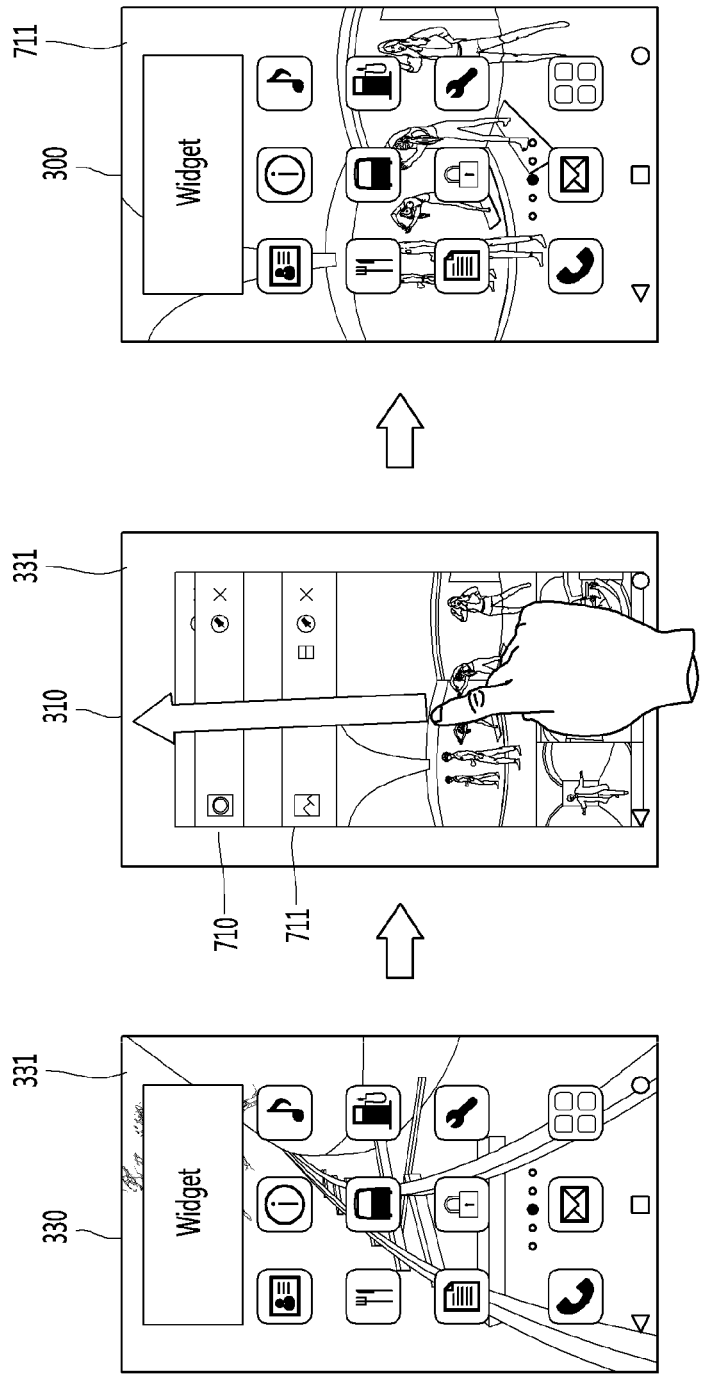

FIGS. 6A to 7 are views for describing a process of setting content of a background screen through an omni-directional content setting request in accordance with an embodiment of the present disclosure.

Referring to FIG. 6A, a home screen 300 is displayed. A partial image 331 of an omni-directional image is displayed on the background screen of the home screen 300.

The controller 180 may receive an omni-directional content setting request in the state in which the home screen 300 is displayed. The omni-directional content setting request may be a pinch-in request.

The controller 180 may display a content setting screen 600 in response to the omni-directional content setting request.

The content setting screen 600 may include a spherical preview region 610 and a content list region 630.

The preview region 610 may be a region for providing an omni-directional image 611 registered as a current background screen in the form of a spherical image.

On the other hand, when a drag input in any one of the up, down, left, and right directions is received with respect to the omni-directional image 611, the omni-directional image 611 may be rotated.

The content list region 630 may be a region for recommending content that can be set as an image of a background screen. The content list region 630 may include a plurality of contents. Each of the plurality of contents may be omni-directional content.

The omni-directional content included in the content list may be one or more of content that the user has most recently reproduced, content stored in the memory 170, and content provided by a content provider.

When the omni-directional content 631 is selected from the plurality of contents included in the content list, the controller 180 may display the selected omni-directional content 631 in the preview region 610 as shown in FIG. 6B.

When the pinch-out request is received through the preview region 631, the controller 180 may set the image 633 of the selected omni-directional content 631 as the background screen. That is, when the pinch-out request is received through the preview region 631, the controller 180 may display the home screen 300 in which the image of the background screen is set as the image 633 of the omni-directional content 631.

Here, the pinch-out request is merely an example, and any request for entering the home screen may be used.

The user can set the image of the background screen as the omni-directional content through a simple input on the home screen.

Next, FIG. 7 is described.

FIG. 7 illustrates an example in which each of a plurality of contents included in the content list has been recently used (or accessed).

Referring to FIG. 7, the partial image 331 of the omni-directional image is displayed on the background screen of the home screen 300.

In this state, the controller 180 may receive the omni-directional content setting request. In this case, the omni-directional content setting request may be a request for selecting the home button icon 510.

The controller 180 may display a recent access content list 710 including a plurality of omni-directional contents having been recently used (or accessed) in response to the omni-directional content setting request.

The recent access content list 710 may include a plurality of omni-directional contents having been accessed by a user in the past.

When the omni-directional content 711 is selected from the plurality of omni-directional contents and an input of moving the selected omni-directional content 711 to the background screen is received, the controller 180 may register the selected omni-directional content 711 as the background screen. That is, the controller 180 may switch the omni-directional image registered as the existing background screen to the omni-directional content 711.

Again, FIG. 2 is described.

On the other hand, the controller 180 receives the home screen editing request (S213), and displays a plurality of home screens in response to the received home screen editing request (S215).

In one embodiment, the home screen editing request may be a request for editing a plurality of home screens. That is, the home screen that can be displayed through the display unit 151 may be configured with a plurality of pages.

In one embodiment, the home screen editing request may be a touch input received on the home screen displayed through the display unit 151 for a predetermined time or longer.

If a deletion request for deleting one or more of the plurality of home screens is received (S217), the controller 180 deletes the home screen (S219).

On the other hand, when the deletion request is not received, the process returns to step S203 again.

Steps S213 to S219 will be described with reference to the following drawings.

Figure 8:
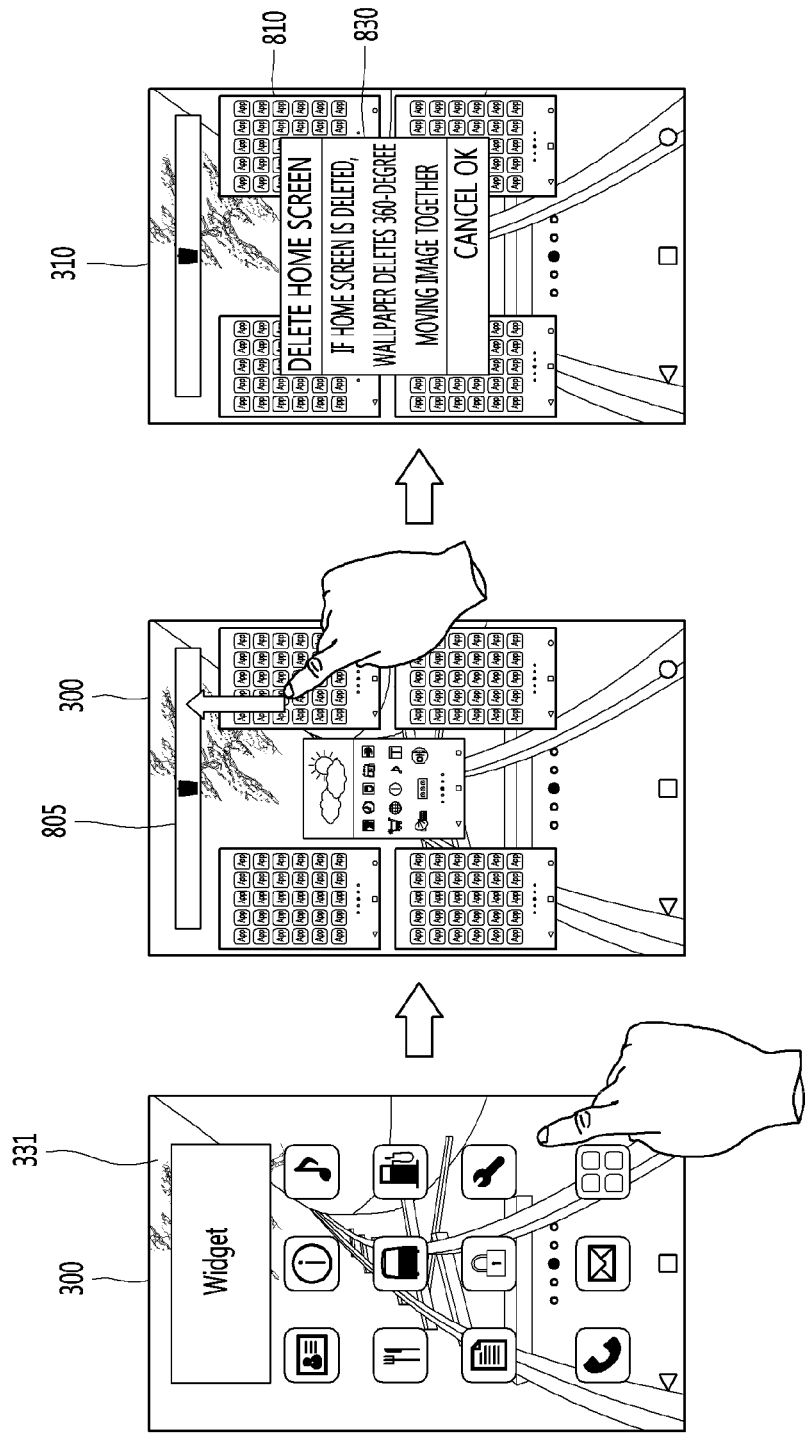
FIGS. 8 and 9 are views for describing an example of editing a plurality of home screens in response to a home screen editing request.
Figure 9:
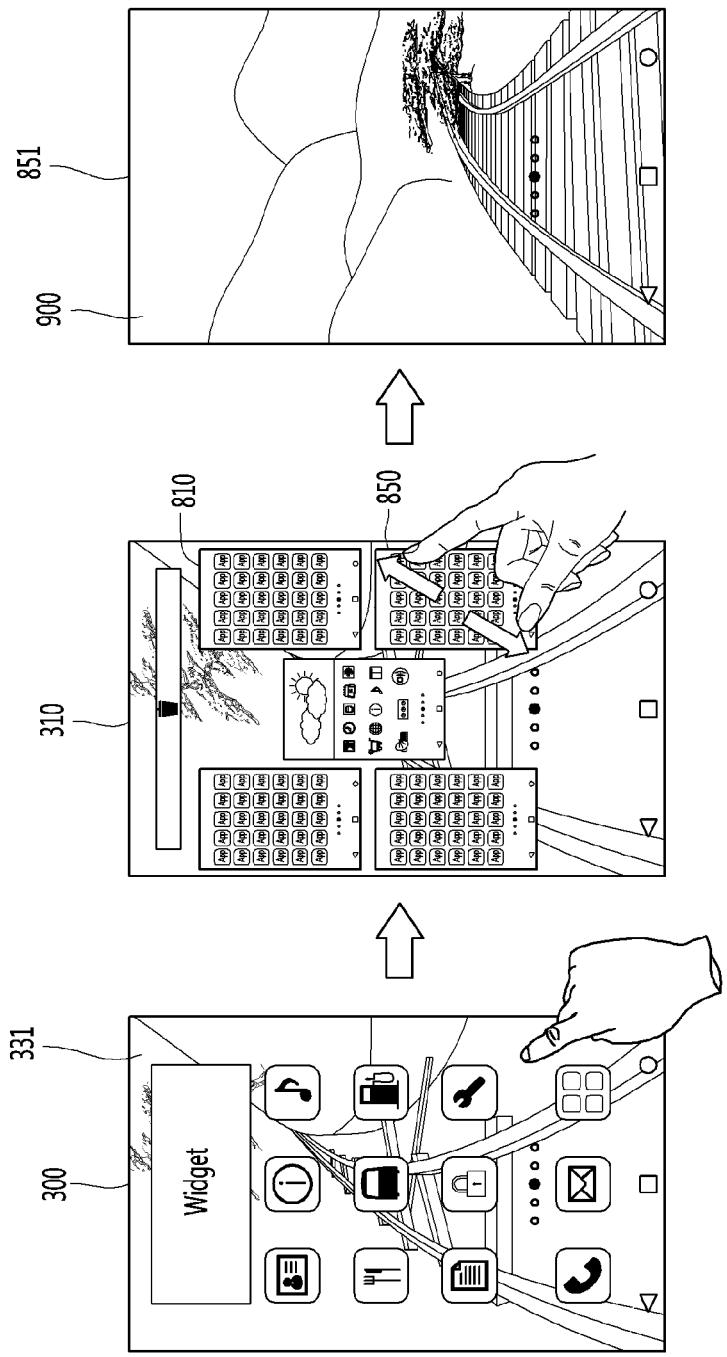

FIGS. 8 and 9 are views for describing an example of editing a plurality of home screens in response to a home screen editing request.

Referring to FIG. 8, a home screen 300 is displayed. In this state, when an input of touching the home screen 300 for a predetermined time is received, the controller 180 may display an integrated home screen view. The integrated home screen view may include a plurality of reduced home screens obtained by reducing the plurality of home screens.

A user can confirm what type of omni-directional moving images is registered on the background screen of each of the plurality of home screens through the integrated home screen view.

The integrated home screen view may further include a recycle bin icon 805.

When a first reduced home screen 810 among the plurality of reduced home screens is selected and a deletion request for moving the selected first reduced home screen 810 to the recycle bin icon 805 is received, the first reduced home screen 810 can be deleted. The controller 180 may display a pop-up window 830 inquiring whether to delete the home screen corresponding to the first reduced home screen 810 before deleting the first reduced home screen 810 according to the deletion request.

The pop-up window 830 may include information indicating that the omni-directional moving image (or 360-degree moving image) registered in the background screen of the home screen corresponding to the first reduced home screen 810 can be deleted together.

On the other hand, as shown in FIG. 9, when a pinch-out request is received with respect to a second reduced home screen 850 among the plurality of reduced home screens, the controller 180 may reproduce the omni-directional moving image 900 registered as the background screen 851 corresponding to the second reduced home screen 850. Here, the pinch-out request may correspond to the clean view entry request described with reference to FIG. 4.

As such, the user can easily and quickly edit the plurality of home screens through the integrated home screen view.

Figure 10:
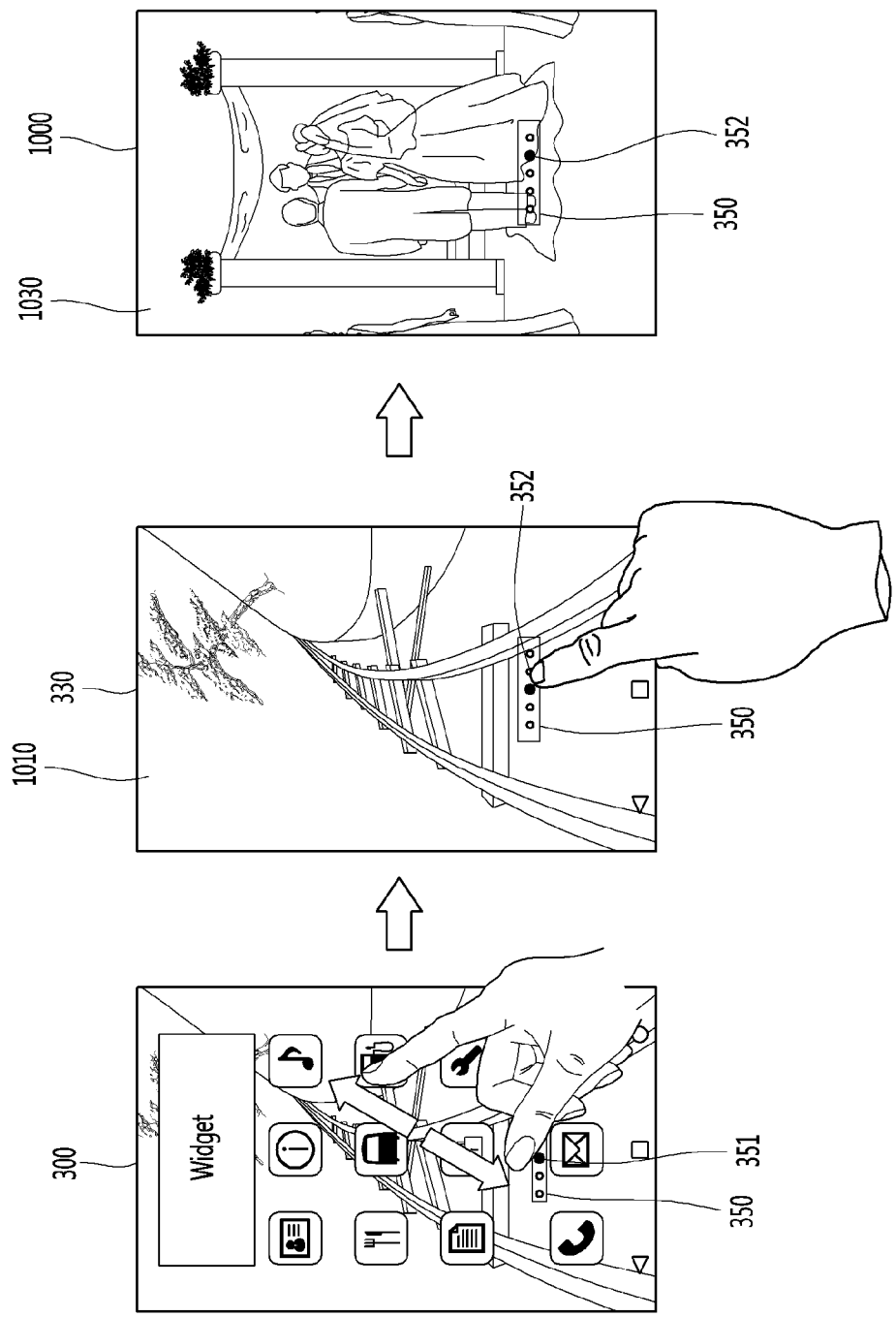
FIG. 10 is a view for describing an example of switching and reproducing an omni-directional moving image displayed on a background screen in response to a clean view entry request.

FIG. 10 is a view for describing an example of switching and reproducing an omni-directional moving image displayed on a background screen in response to a clean view entry request.

Referring to FIG. 10, a home screen 300 is displayed. A page indicator group 350 may be displayed on the home screen 300. The page indicator group 350 may be a group indicating in which page (or at which position) the home screen being currently displayed through the display unit 151 among the plurality of home screens is located.

The page indicator group 350 may include a plurality of page indicators. The number of page indicators may correspond to the number of home screens.

In FIG. 10, the first page indicator 251 may identify which page the home screen displayed on the display unit 151 is.

When the clean view entry request is received, the controller 180 may remove the item screen and reproduce the first omni-directional moving image 1010 on the background screen 330.

In this state, when a request for selecting a second page indicator 352 is received, the controller 180 may reproduce the second omni-directional moving image 1030 on the background screen 1000 corresponding to the second page indicator 352.

When the omni-directional moving image is registered on the background screen of each of the plurality of home screens, the user can quickly enjoy the omni-directional moving image through the page indicator.

FIG. 11 is a view for describing that a scroll speed of an omni-directional image is different based on a speed of a drag input for an omni-directional image in accordance with an embodiment of the present disclosure.

Referring to FIG. 11, the display unit 151 of the mobile terminal 100 displays a partial image 1110 of an omni-directional image 1100. A partial image 1110 may be displayed on the background screen from which a home screen or an item screen is removed.

The controller 180 may adjust a scroll speed of an omni-directional image based on a speed of a drag input inputted through the display unit 151.

The controller 180 may increase the scroll speed of the omni-directional image as the speed of the drag input increases.

The controller 180 may reduce the scroll speed of the omni-directional image as the speed of the drag input decreases.

For example, a case where the moving speed of the drag input is a first speed v1 and a case where the moving speed of the drag input is a second speed v2 are compared. Here, the first speed v1 may be lower than the second speed v2.

The speed at which the partial image included in the omni-directional image 1100 are scrolled when the drag input of the first speed v1 is received based on the elapsed time of one second may be lower than the speed at which the partial image included in the omni-directional image 1100 is scrolled when the drag input of the second speed v2 is received.

FIGS. 12A to 13B are views for describing an example of controlling an omni-directional moving image displayed on a background screen in accordance with various embodiments of the present disclosure.

Figure 12A:
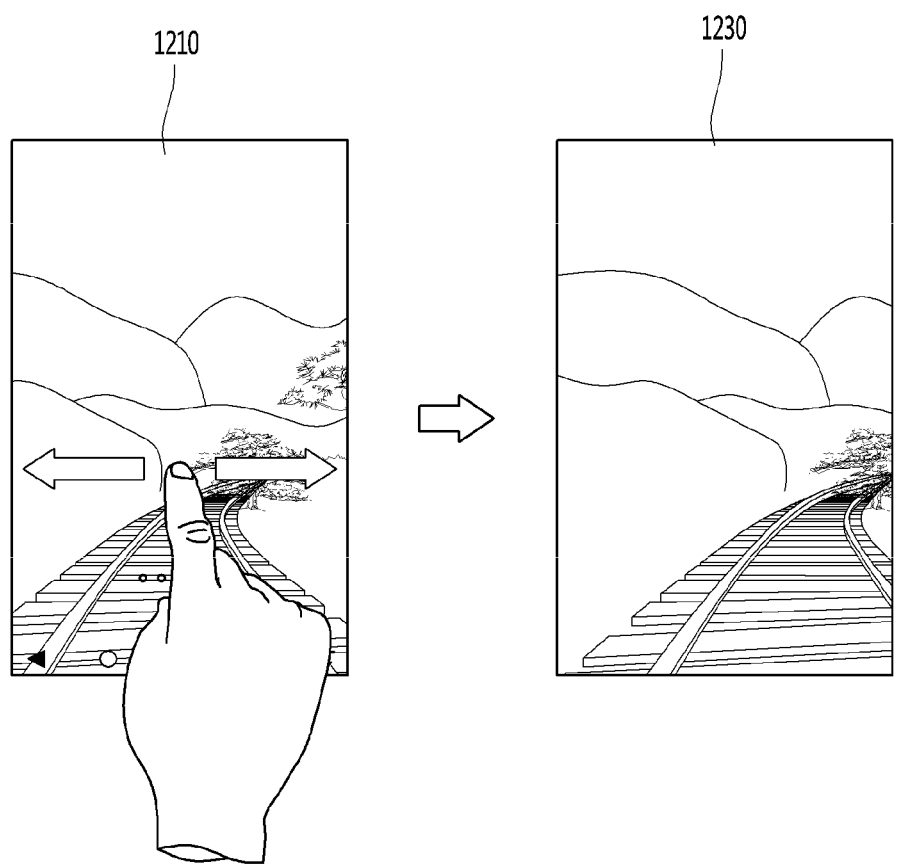
FIGS. 12A to 13B are views for describing an example of controlling an omni-directional moving image displayed on a background screen in accordance with various embodiments of the present disclosure.

Referring to FIG. 12A, the display unit 151 reproduces the omni-directional moving image on the background screen. When a drag input in a left or right direction is received during reproduction of a first omni-directional frame image 1210 corresponding to a first field of view, the controller 180 may switch the first omni-directional frame image 1210 to a second omni-directional frame image 1230 corresponding to a second field of view.

Figure 12B:
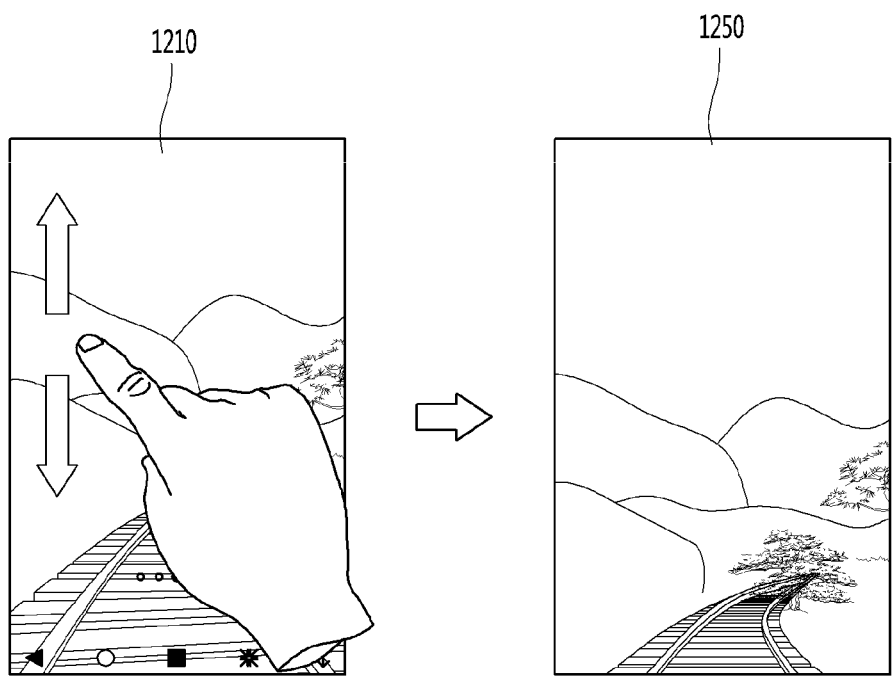

Referring to FIG. 12B, when a drag input in an upper or lower direction is received during reproduction of a first omni-directional frame image 1210 corresponding to a first field of view, the controller 180 may switch the first omni-directional frame image 1210 to a third omni-directional frame image 1250 corresponding to a third field of view.

Figure 13A:
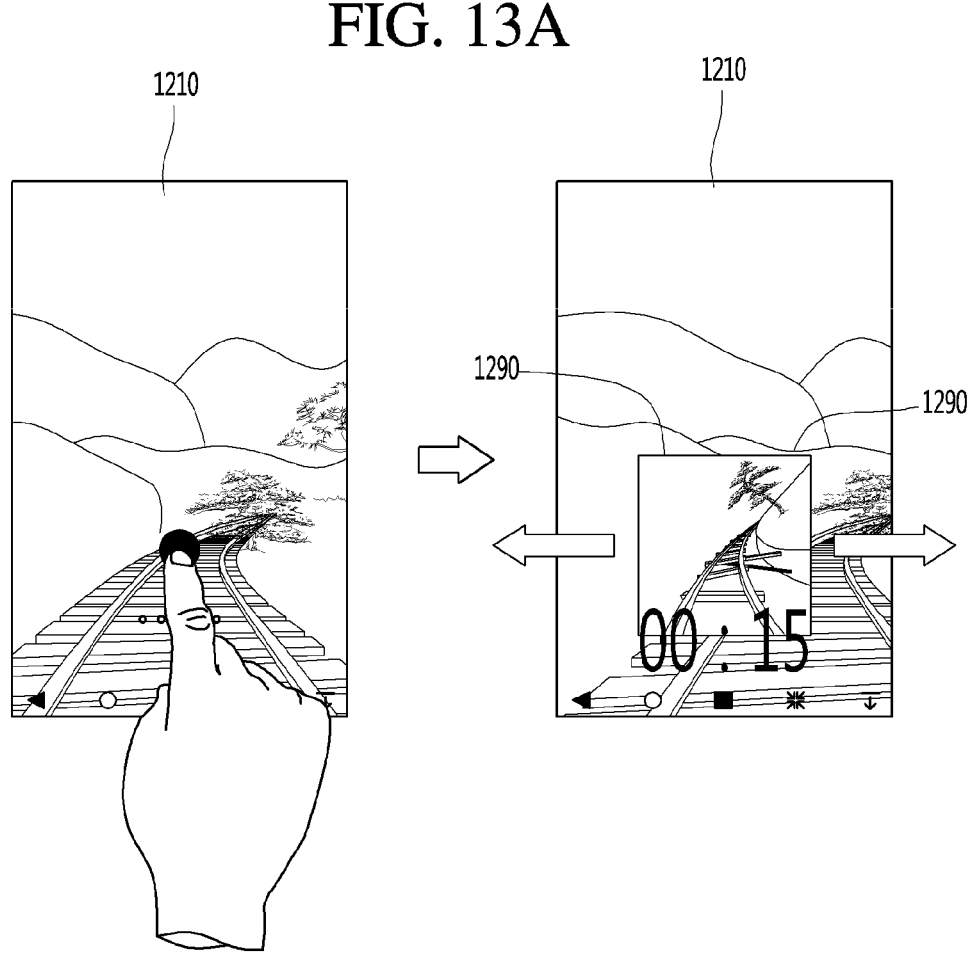

Referring to FIG. 13A, when a touch input over a predetermined period of time is received on the background screen and a drag input in a left or right direction is received, the controller 180 may change the reproduction time point of the omni-directional moving image. In addition, the controller 180 may display one or more of reproduction section information and an omni-directional thumbnail image 1290 corresponding to the changed reproduction time point according to the drag input.

Figure 13B:
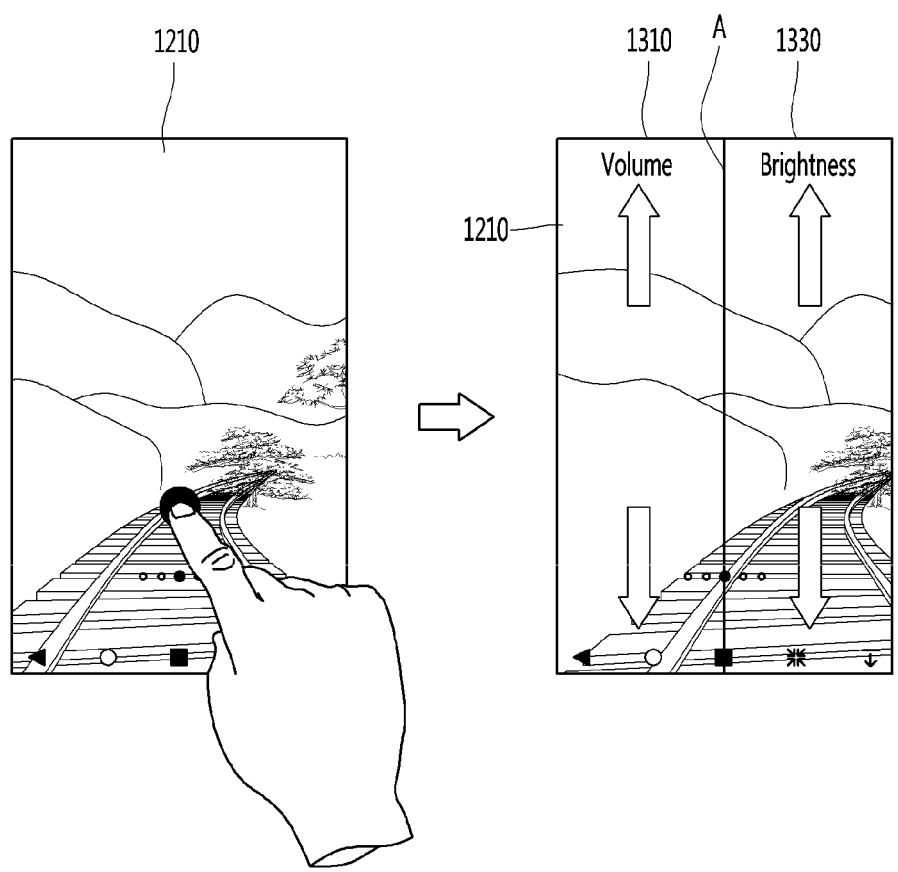

Referring to FIG. 13B, a touch input over a predetermined period of time may be received on the background screen. Thereafter, when a drag input in an upper or lower direction is received on a left region 1310 based on the center line A of the background screen, the controller 180 may adjust the volume of the omni-directional moving image.

When a drag input in an upper or lower direction is received on a right region 1310 based on the center line A of the background screen, the controller 180 may adjust the brightness of the omni-directional moving image.

FIGS. 14 to 17 are views for describing an example of utilizing an omni-directional image received in real-time streaming as an image of a background screen in accordance with an embodiment of the present disclosure.

The omni-directional image may be an image received by CCTV, but this is merely an example.

Figure 14:
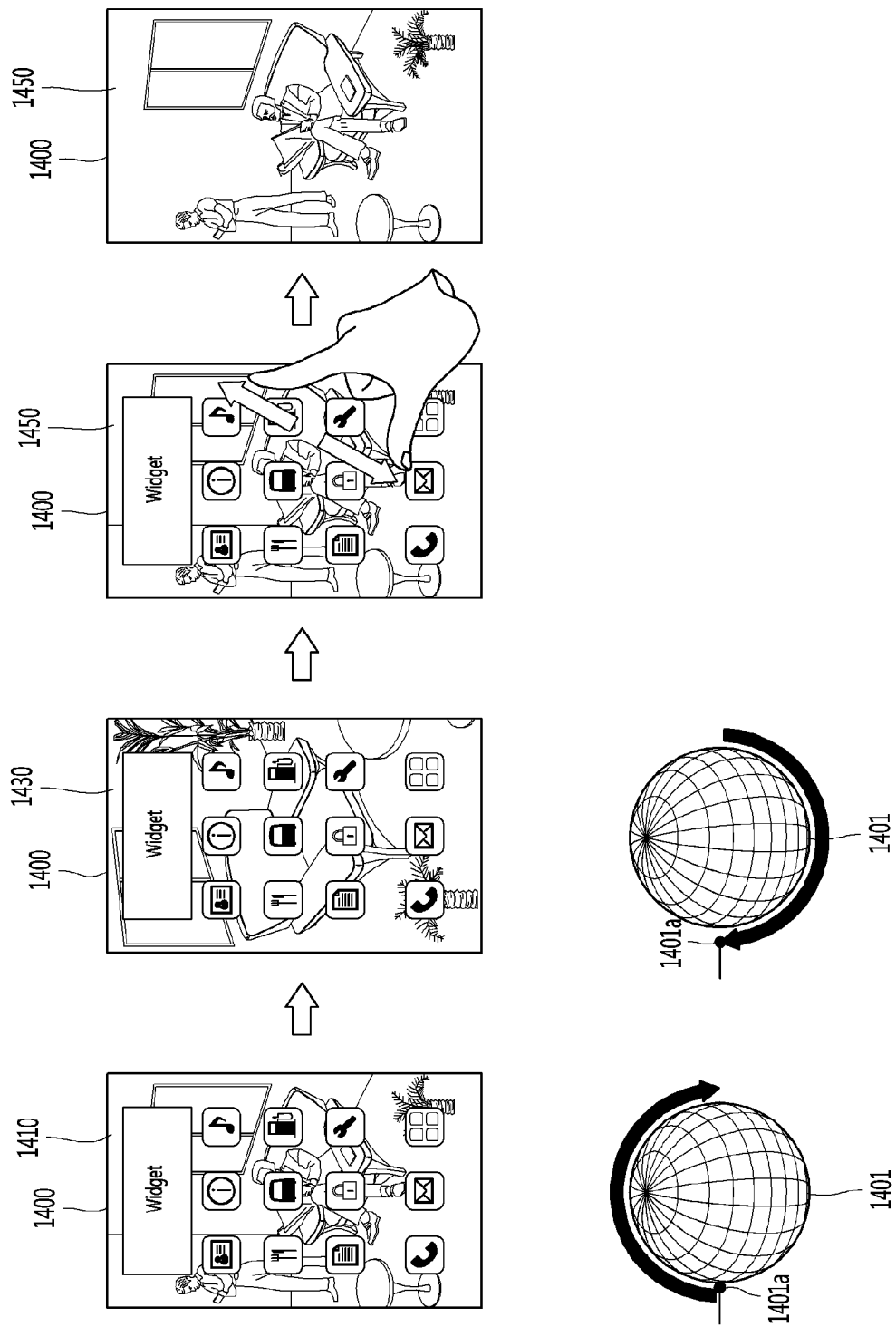
FIGS. 14 to 17 are views for describing an example of utilizing an omni-directional image received in real-time streaming as an image of a background screen in accordance with an embodiment of the present disclosure.

Referring to FIG. 14, a first partial image 1410 included in the omni-directional image received in real-time streaming from a server may be displayed on a background screen of a home screen 1400.

The partial image 1410 may correspond to one point 1401a of a spherical omni-directional image 1401. The first partial image 1410 displayed on the background screen may be switched to a second partial image 1430 included in the omni-directional image according to the rotation of the omni-directional image 1401.

When the spherical omni-directional image 1401 is rotated according to the flow of time and returns to the original point 1401a, the controller 180 may update the image of the background screen based on the omni-directional image being currently received. Accordingly, the updated omni-directional image 1450 may be displayed on the background screen.

In this state, when a pinch-out request is received, the controller 180 may remove the item screen and reproduce the updated omni-directional image 1450 on the background screen.

Figure 15:
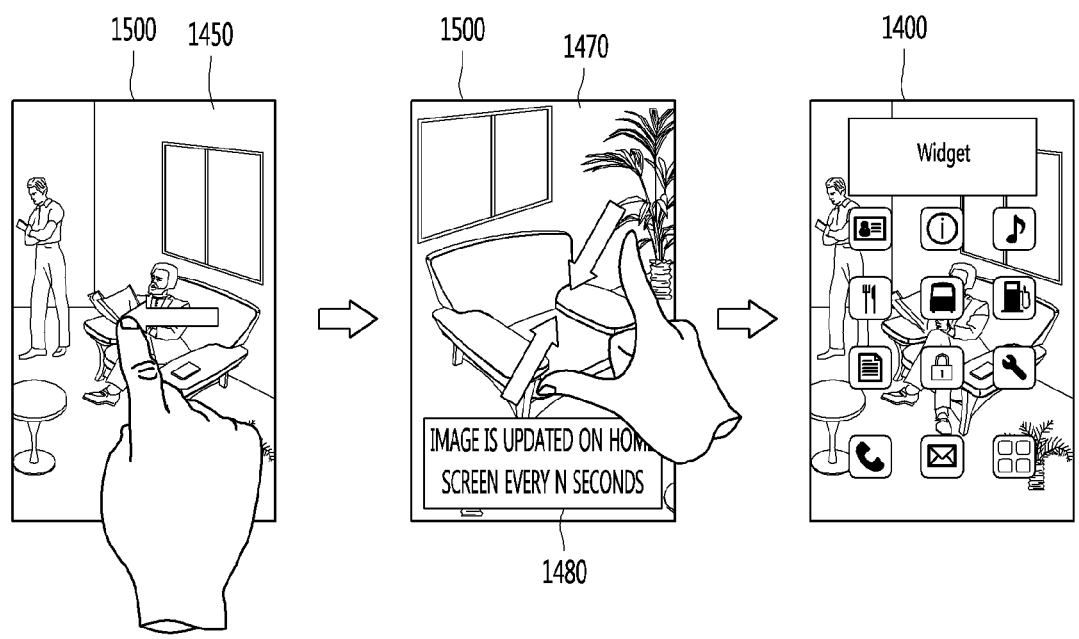

Meanwhile, referring to FIG. 15, the controller 180 may receive a drag input during the display of the omni-directional image 1450. The controller 180 may switch the omni-directional image 1450 to another omni-directional image 1490 according to the drag input.

In addition, the controller 180 may adjust the update interval of the omni-directional image based on the speed of the received drag input. For example, the controller 180 may reduce the update interval of the omni-directional image as the drag input speed increases, and may increase the update interval of the omni-directional image as the drag input speed decreases. The speed of the drag input may correspond to the speed at which the omni-directional image is scrolled.

The controller 180 may display a pop-up window 1480 indicating that the omni-directional image is updated at regular intervals, based on the speed of the drag input.

In this state, when a pinch-in request is received, the controller 180 may display the home screen 1400 including the item screen and the background screen.

The controller 180 may update the omni-directional image displayed on the background screen at a time interval corresponding to the speed of the drag input.

As the omni-directional image is updated at regular intervals, the amount of data consumed by the mobile terminal 100 due to the reception of the omni-directional image may be reduced.

Figure 16:
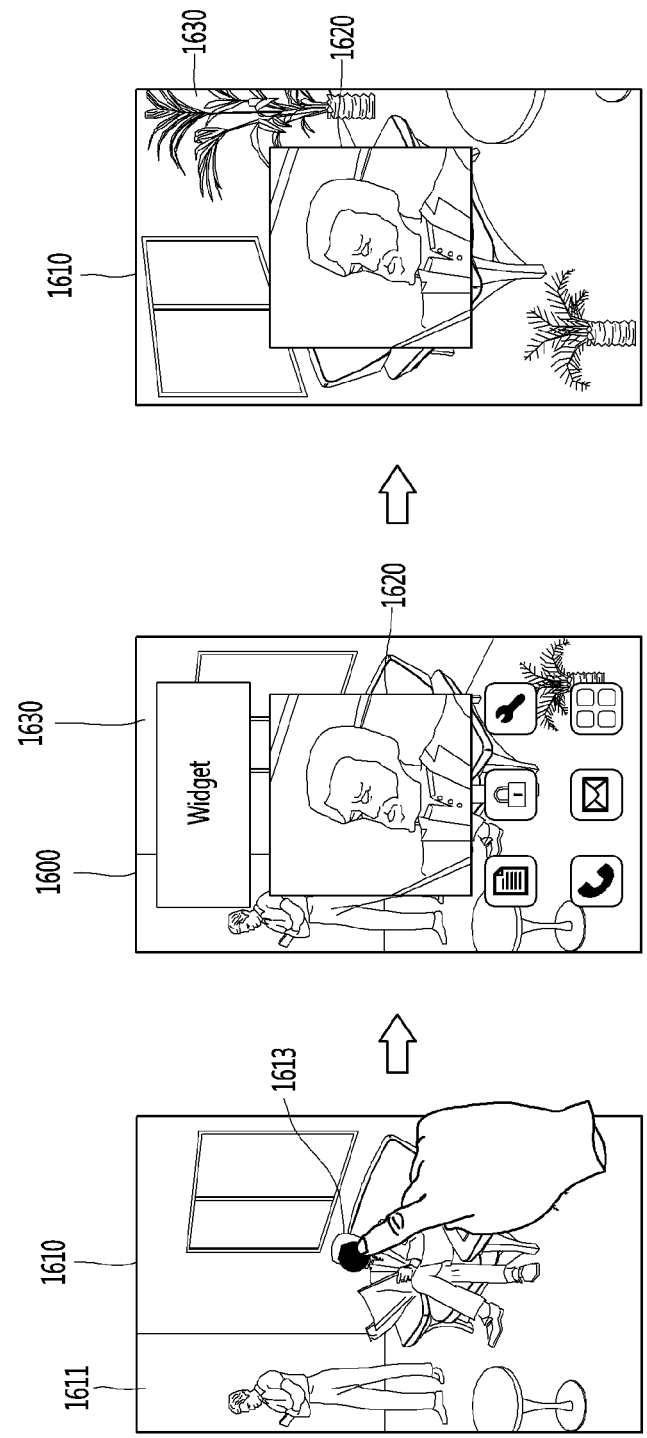

Next, FIG. 16 is described.

Referring to FIG. 16, a partial image 1611 included in an omni-directional image may be displayed on a background screen 1610 according to a clean view entry request.

The omni-directional image may be a moving image received from a server in real-time streaming.

When a specific object 1613 included in the partial image 1611 is selected for a predetermined period of time or longer, the controller 180 may track the selected specific object 1613 in the received omni-directional image.

The controller 180 may display a home screen 1600 in response to a pinch-in request. The home screen 1600 may include a tracking region 1620 that displays the tracked object 1613. The tracking region 1620 may be continuously displayed even if the partial image 1611 included in the omni-directional image displayed on the background screen of the home screen 1600 is switched to another image 1630 (even if scrolled).

In one embodiment, the tracking region 1620 may be displayed in an empty region of the item screen. The empty region of the item screen may be a region in which an application icon or a widget is not displayed.

On the other hand, when the intensity of a sound received together with the omni-directional image is equal to or greater than reference intensity, the controller 180 may notify the sound. For example, when the intensity of the sound received together with the omni-directional image is equal to or greater than the reference intensity, the sound may be outputted through the audio output module 152, or a vibration pattern may be outputted through the haptic module 153.

On the other hand, when the sound over the reference intensity is continuously received for a predetermined period of time, the controller 180 may reproduce the omni-directional image while switching the home screen 1600 to the background screen 1610. Accordingly, the partial image 1630 and the tracking region 1620 of the omni-directional image being currently received may be displayed on the background screen 1610.

Figure 17:
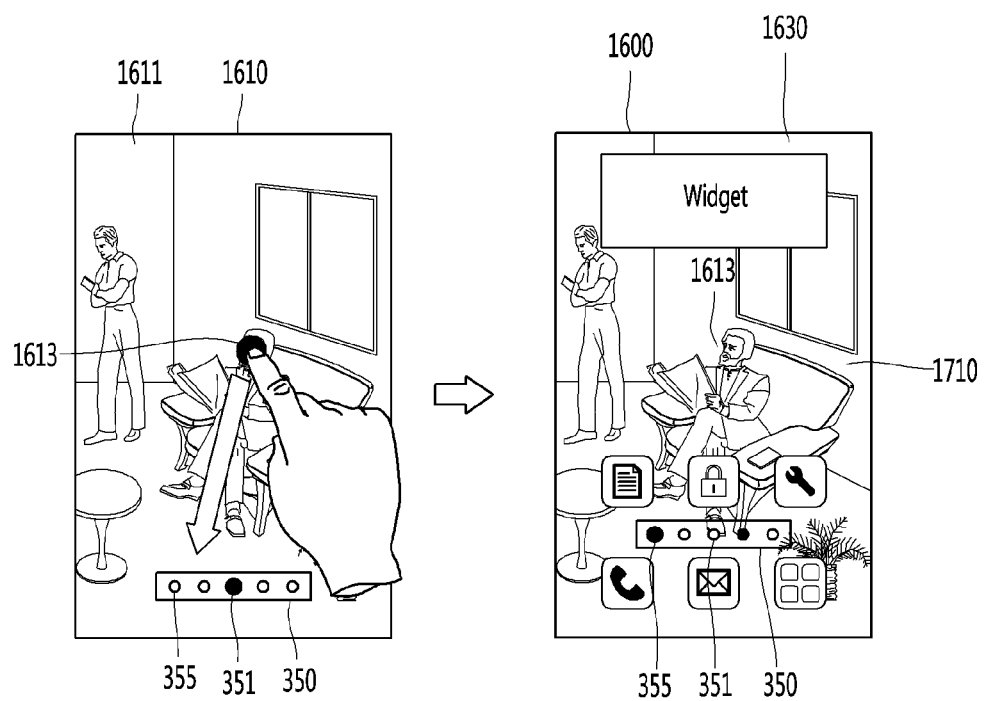

Next, FIG. 17 is described.

A description redundant to FIG. 16 will be omitted. A page indicator group 350 may be further displayed on a background screen 1610. The currently displayed background screen 1610 may be a screen corresponding to a first home screen of a first page. Since the background screen 1610 corresponding to the first home screen is displayed on the display unit 151, a first page indicator 351 included in a page indicator group 350 may be identified.

When a specific object 1613 included in a partial image 1611 is selected for a predetermined period of time and an input of moving the selected object 1613 to a third page indicator 355 is received, the controller 180 may display an omni-directional image 1710 that tracks the selected object 1613 on the background screen of the third home screen 1700 corresponding to the third page indicator 355.

That is, the omni-directional image 1710 including the selected object 1613 may be reproduced on the background screen of the third home screen 1700.

Figure 18:
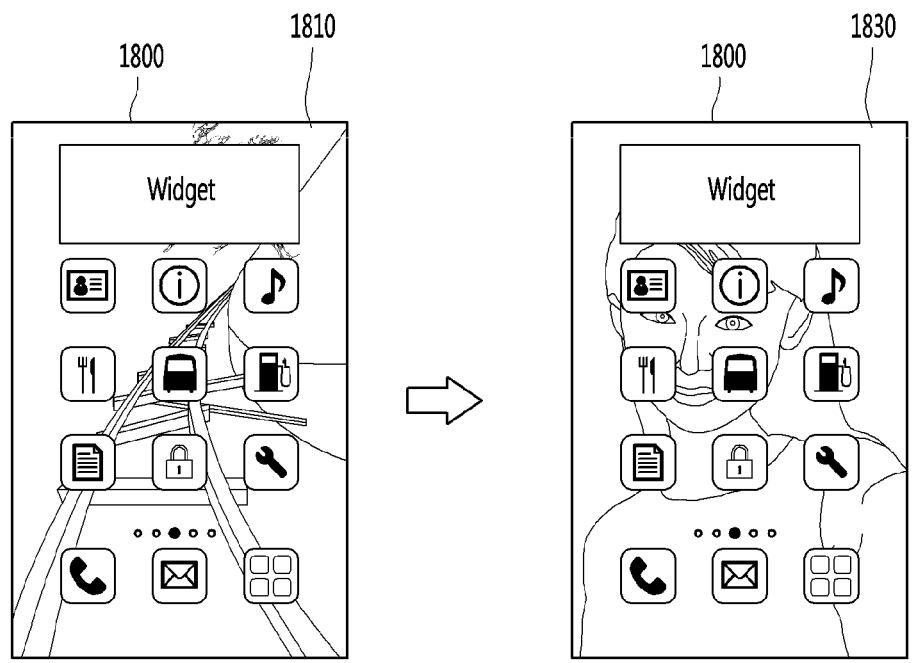
FIGS. 18 and 19 are views for describing an example of automatically switching an omni-directional moving image set as a background screen of a home screen to another omni-directional image according to a specific event in accordance with an embodiment of the present disclosure.
Figure 19:
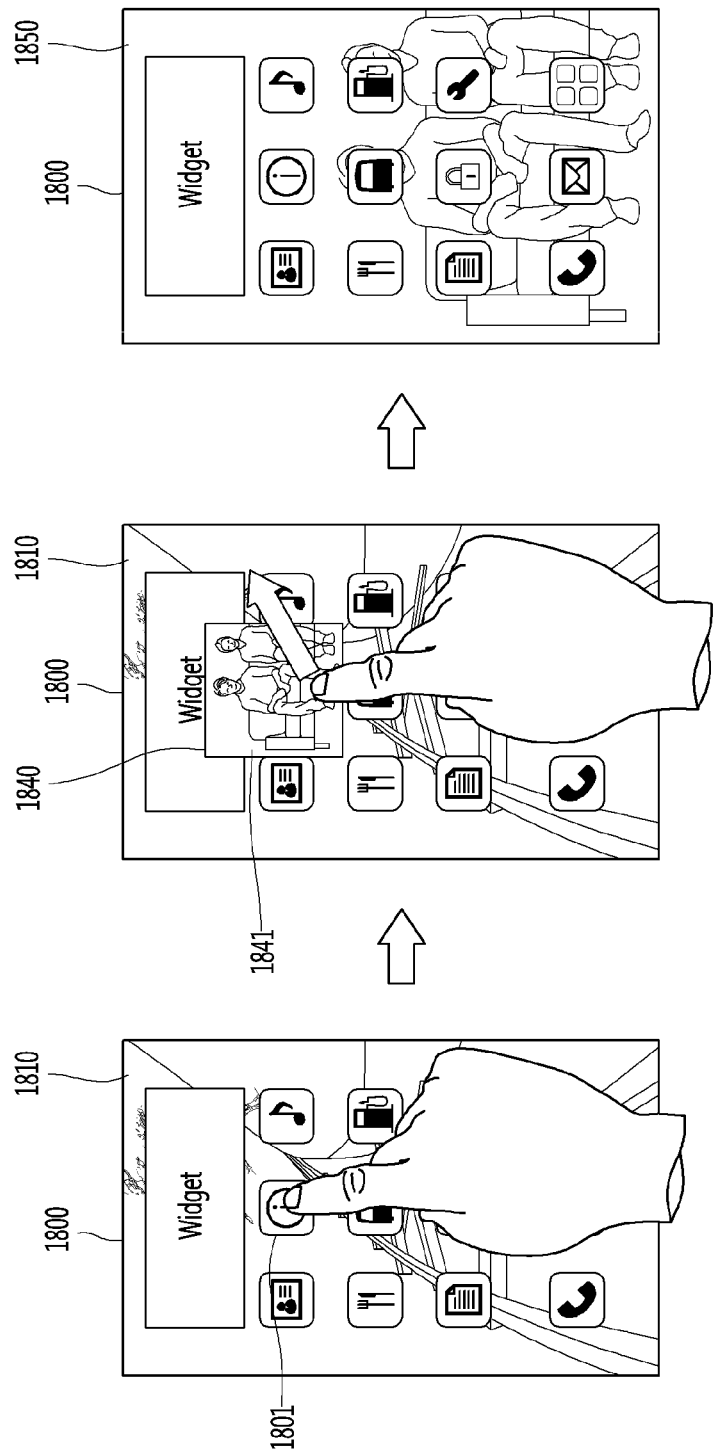

FIGS. 18 and 19 are views for describing an example of automatically switching an omni-directional moving image set as a background screen of a home screen to another omni-directional image according to a specific event in accordance with an embodiment of the present disclosure.

Referring to FIG. 18, the display unit 151 of the mobile terminal 100 displays a home screen 1800. A partial image 1810 of a still image corresponding to a specific reproduction time point of an omni-directional motion image is displayed on a background screen of the home screen 1800.

The controller 180 may acquire an event for switching the omni-directional moving image and may switch the omni-directional moving image set as the background screen to another omni-directional moving image based on the acquired event. Accordingly, a partial image 1830 of a still image corresponding to a specific reproduction time point of another omni-directional moving image may be displayed on the background screen of the home screen 1800.

In one embodiment, the event for switching the omni-directional moving image may be detected based on a reserved viewing time. That is, when the reserved viewing time of the streaming omni-directional image is set, the controller 180 may automatically switch the omni-directional moving image set on the background screen of the home screen to a streaming omni-directional moving image if the reserved viewing time has passed.

In another embodiment, the event for switching the omni-directional moving image may be detected based on an application that provides a moving image streaming service.

Referring to FIG. 19, a streaming application icon 1801 corresponding to a streaming application providing a streaming omni-directional image may be displayed on the home screen. When the streaming application icon 1801 is selected for a predetermined time or more, the controller 180 may display a streaming list 1840 that can be provided through the streaming application.

When a specific streaming item 1841 is selected in the streaming list 1840 and an input of dragging the selected streaming item 1841 to a background screen is received, the controller 180 may set the streaming omni-directional image corresponding to the streaming item 1841 as the background screen.

Accordingly, a partial image 1850 of the streaming omni-directional image can be displayed on the background screen.

Figure 20A:
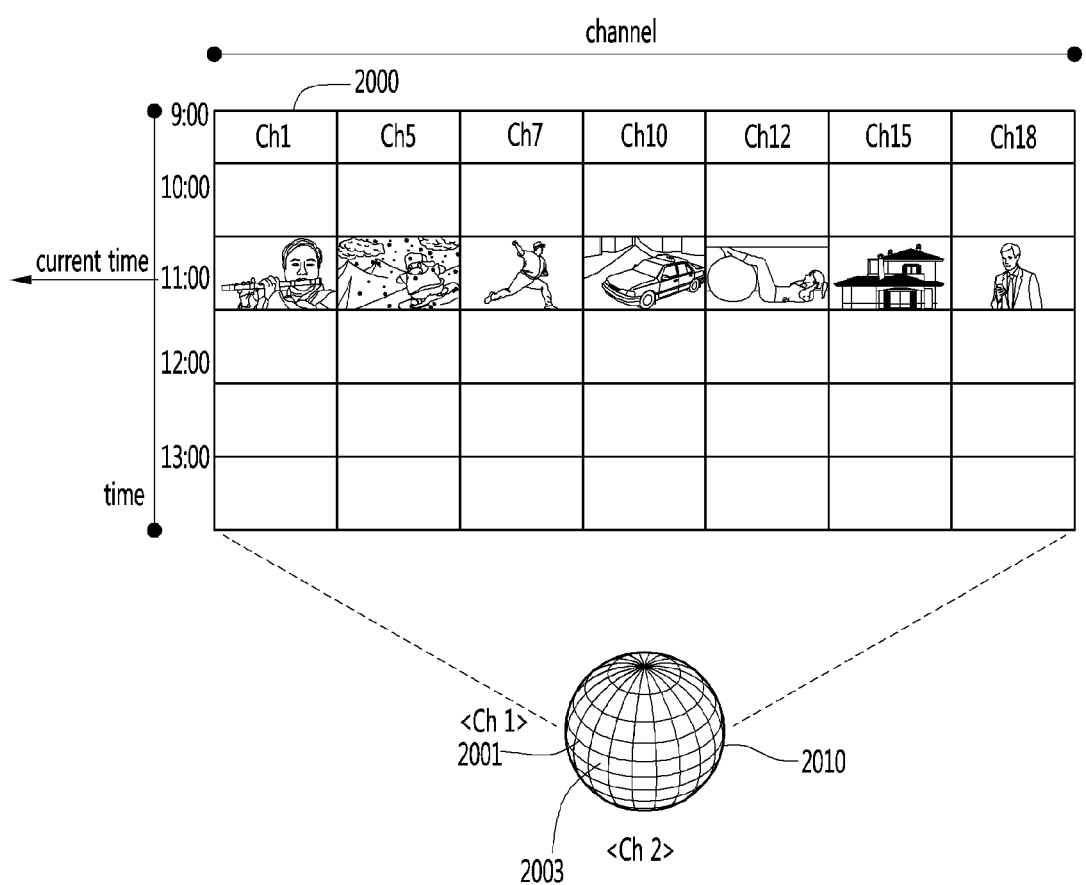

FIGS. 20A and 20B are views for describing an example of utilizing information about a channel as an omni-directional image of a background screen in accordance with an embodiment of the present disclosure.

Referring to FIG. 20A, an electronic program guide 2000 for providing information about broadcast channels and broadcast programs provided in the broadcast channels is shown.

The omni-directional image may include thumbnails of broadcast programs corresponding to a plurality of channels.

A first point 2001 of a spherical omni-directional image 2010 may correspond to a first channel ch1, and a second point 2003 may correspond to a second channel ch2. The omni-directional image 2010 set as the background screen may be rotated or scrolled with the passage of time.

Referring to FIG. 20B, the first thumbnail 2020 of the broadcast program being currently broadcasted on the first channel corresponding to the first point 2001 may be displayed on the home screen 2000. The thumbnail 2020 of the broadcast program may be an omni-directional moving image or image.

The controller 180 may switch the first thumbnail 2020 to the second thumbnail 2030 of the broadcast program being currently broadcast on the second channel corresponding to the second point 2003 according to an automatic scroll function. In this state, when a clean view entry request (i.e., a pinch-out request) is received, the controller 180 may display only the background screen 2050 and display the second thumbnail 2030 on the background screen 2050.

When it is detected that the mobile terminal 100 is rotated by 90 degrees, the controller 180 may reproduce the broadcast program corresponding to the second thumbnail 2030 on the background screen. In this case, the broadcast program corresponding to the second thumbnail 2030 may be received through the broadcast receiving module 111 shown in FIG. 1.

The user can easily obtain broadcast information through the thumbnail of the broadcast program set as the background screen, and can quickly view a desired broadcast program.

Figure 21:
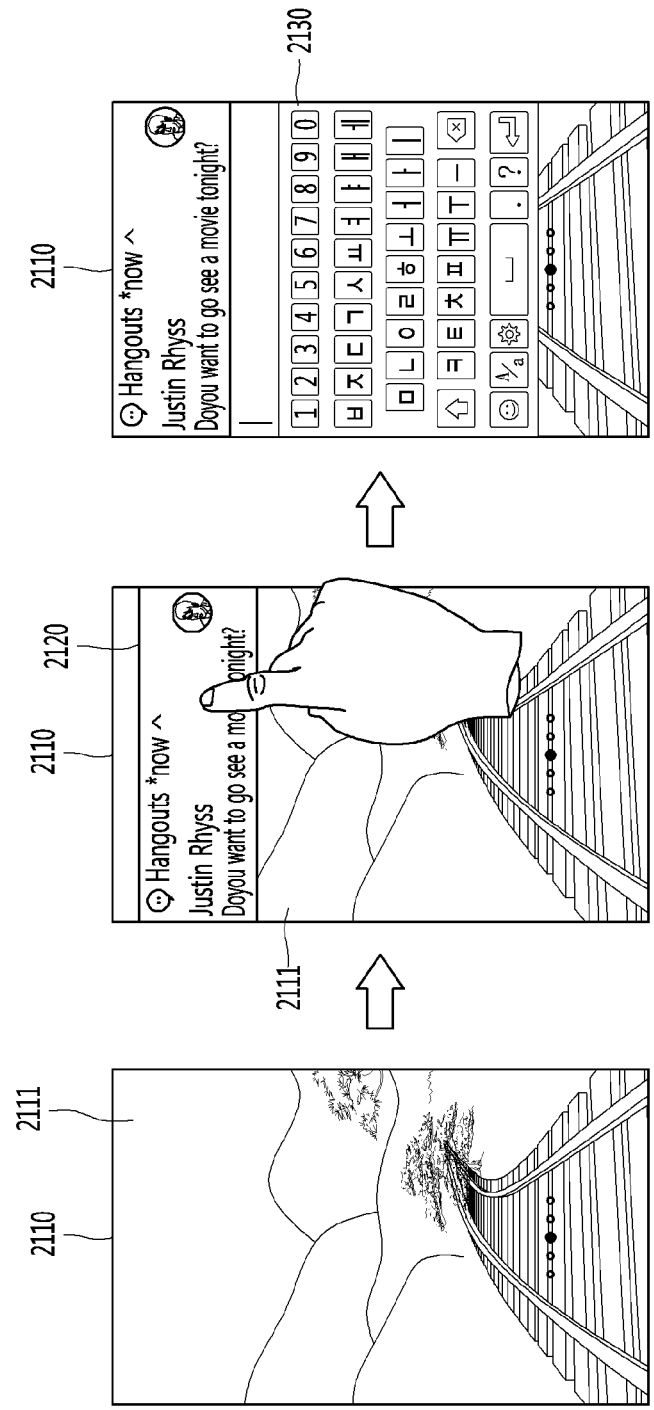
FIGS. 21 to 23 are views illustrating an embodiment in which a notification message is utilized when a notification message is received while an omni-directional moving image is being reproduced on a home screen.
Figure 22:
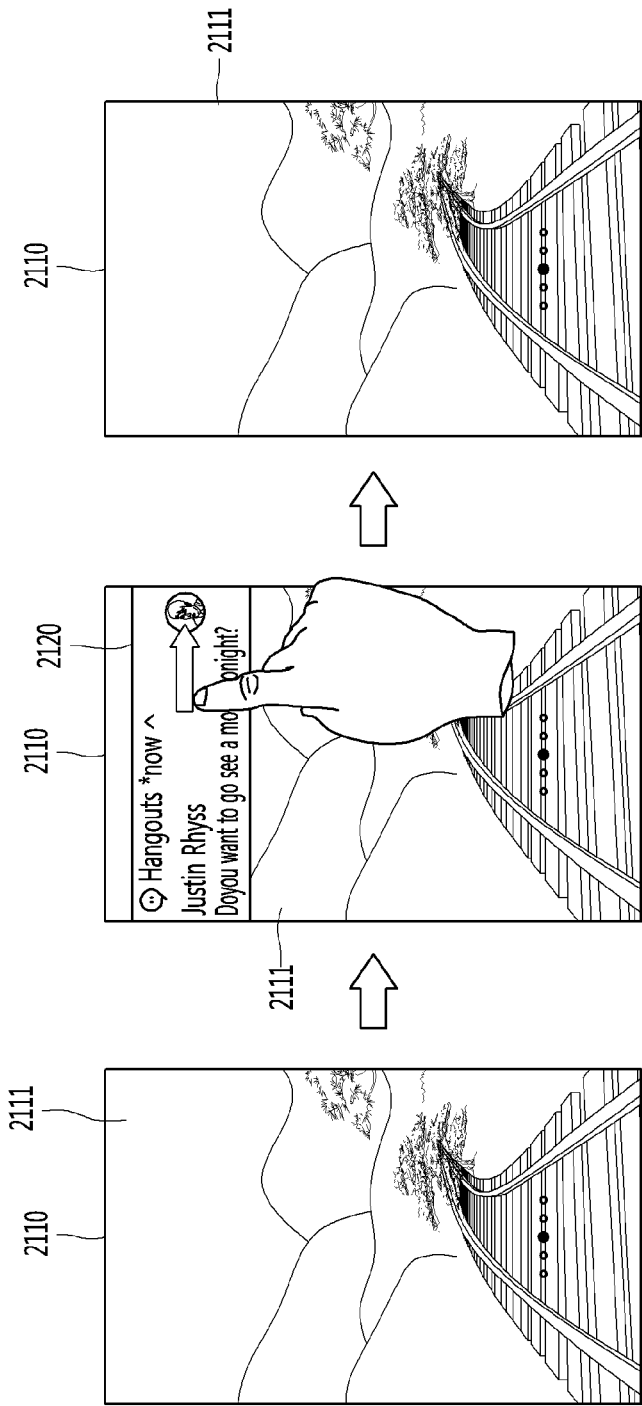
Figure 23:
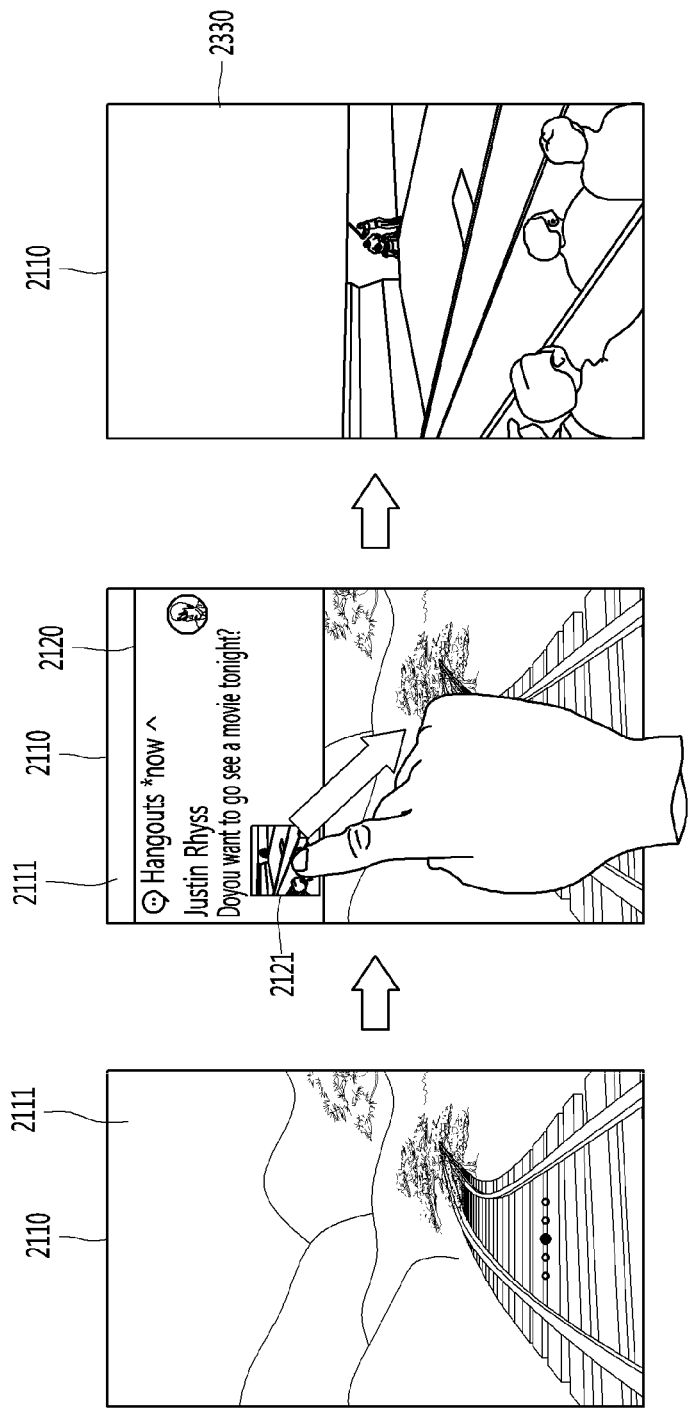

FIGS. 21 to 23 are views illustrating an embodiment in which a notification message is utilized when a notification message is received while an omni-directional moving image is being reproduced on a home screen.

It is assumed that FIGS. 21 to 23 start from displaying only the background screen included in the home screen in response to the clean view entry request described with reference to FIG. 2.

Referring to FIG. 21, the omni-directional moving image is reproduced on the background screen 2110.

Accordingly, a part of the image 2111 at a specific reproduction time point for the omni-directional moving image is displayed.

During the reproduction of the omni-directional moving image, the controller 180 may receive a notification message 2120. The controller 180 can display the received notification message 2120 while being superimposed on the partial image 2111.

When the notification message 2120 is selected, the controller 180 may display, on the background screen 2110, a keyboard window 2130 for responding to the partner terminal that has transmitted the notification message 2120.

The user can confirm the notification and quickly respond while watching the omni-directional moving image on the home screen.

Referring to FIG. 22, when a swype input is received with respect to the notification message 2120, the controller 180 may remove the notification message 2120 from the background screen 2110.

Referring to FIG. 23, an omnidirectional image 2121 corresponding to an omni-directional moving image may be attached to the notification message 2120. When a drag input of moving the selected omni-directional image 2121 to the background screen 2110 is received, the controller 180 may reproduce an omni-directional motion image 2330 corresponding to the omni-directional image 2121 on the background screen 2110.

The user can quickly enjoy the omni-directional moving image corresponding to the image included in the notification message.

FIGS. 24 to 27 are views for describing an example of controlling reproduction of an omni-directional moving image through a video application in accordance with various embodiments of the present disclosure.

Figure 24:
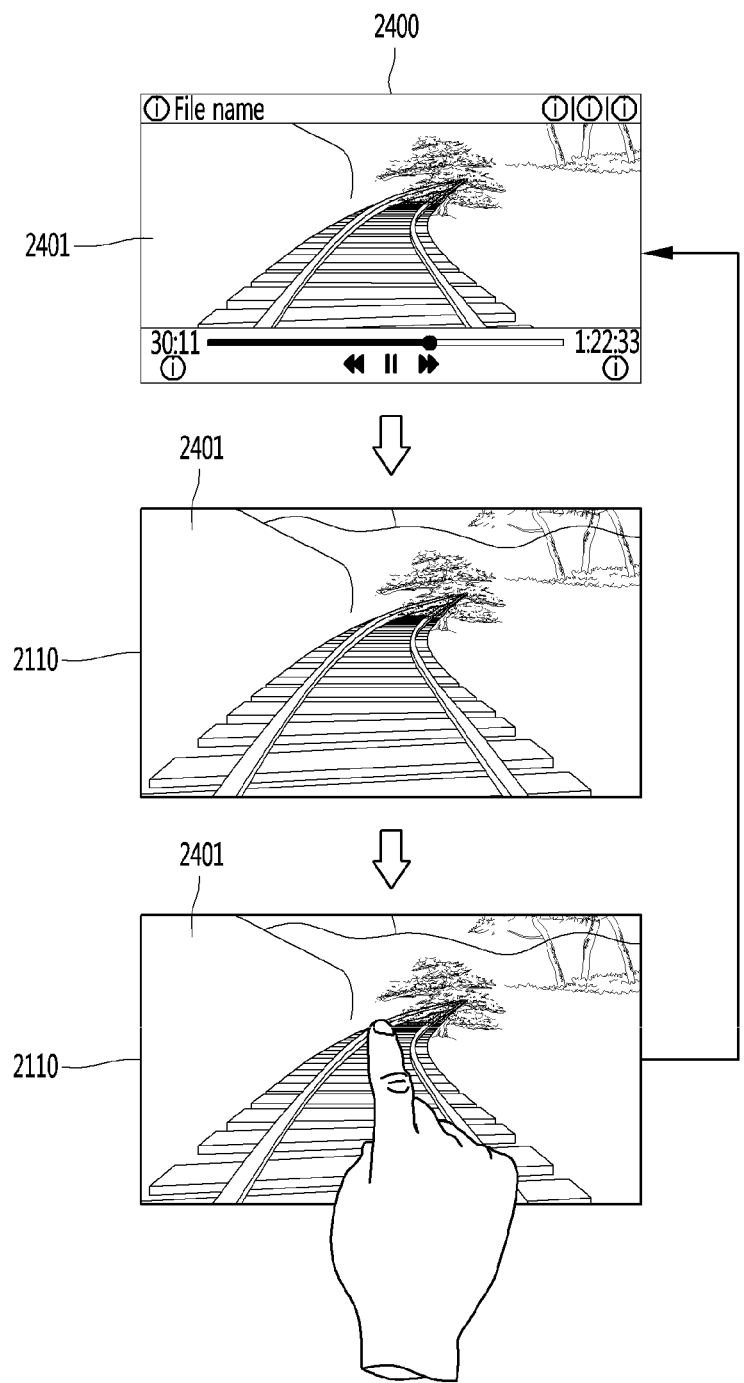
FIGS. 24 to 27 are views for describing an example of controlling reproduction of an omni-directional moving image through a video application in accordance with various embodiments of the present disclosure.

Referring to FIG. 24, an execution screen 2400 of a video application capable of reproducing an omni-directional moving image is shown.

The embodiment of FIG. 24 may be based on the embodiment of FIG. 4. That is, an execution screen 2400 of a video application may be displayed as the mobile terminal 100 is rotated by 90 degrees during reproduction of an omni-directional moving image on a clean view screen.

An omni-directional motion image 2401 may be reproduced on the execution screen 2400 of the video application.

When a certain period of time has elapsed during the reproduction of the omni-directional moving image 2401 through the video application, the controller 180 may remove the execution screen 2400 of the video application and display only the omni-directional moving image 2401. That is, it is possible to switch to the clean view screen 2110.

When a touch input is received on the clean view screen 2110, the controller 180 may display the execution screen 2400 of the video application again.

Figure 25:
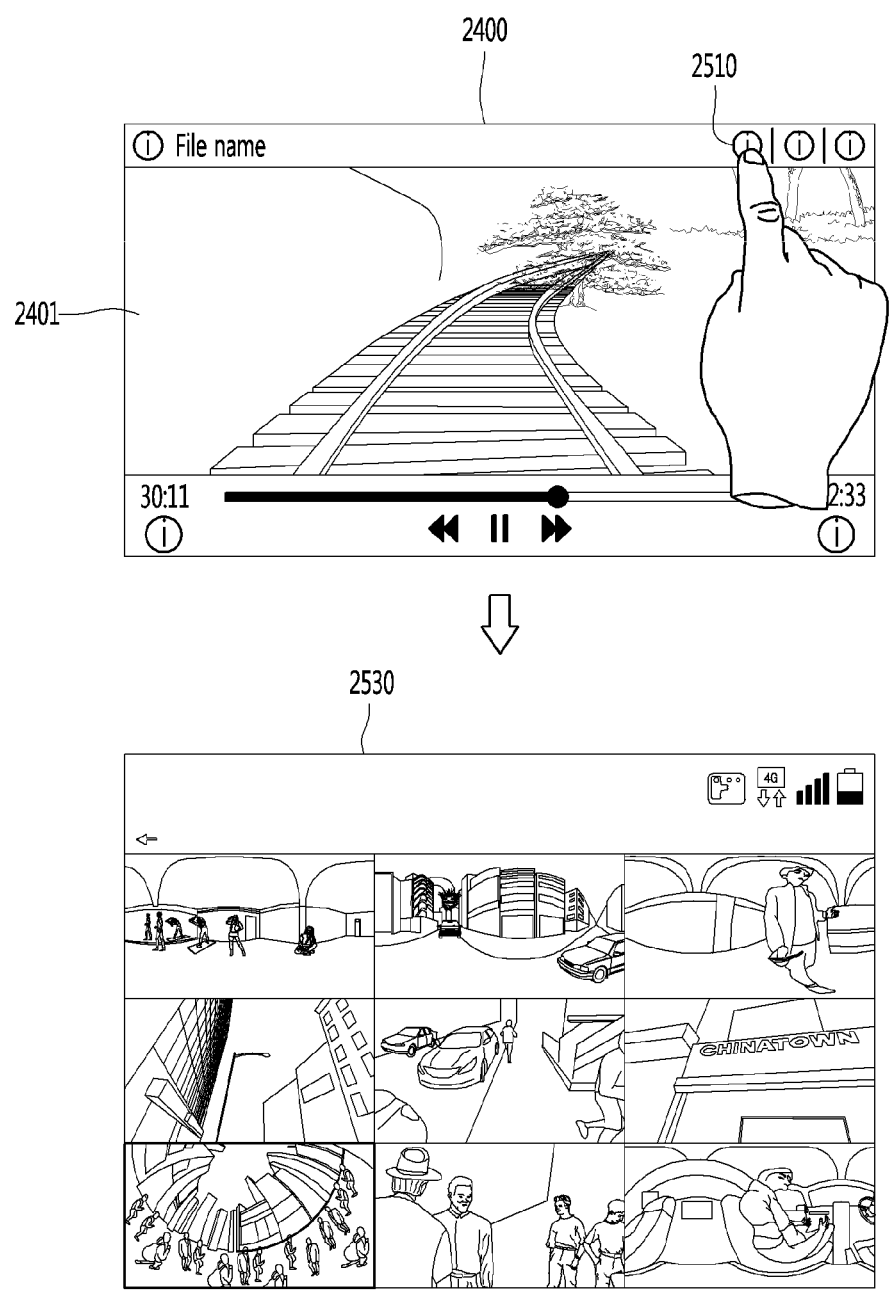

Referring to FIG. 25, the execution screen 2400 of the video application may further include a playlist icon 2510. When the playlist icon 2510 is selected, the controller 180 may display an omni-directional moving image list 2530 including a plurality of omni-directional moving images as shown in FIG. 25.

The user can select and view a desired omni-directional moving image through the omni-directional moving image list 2530.

Figure 26:
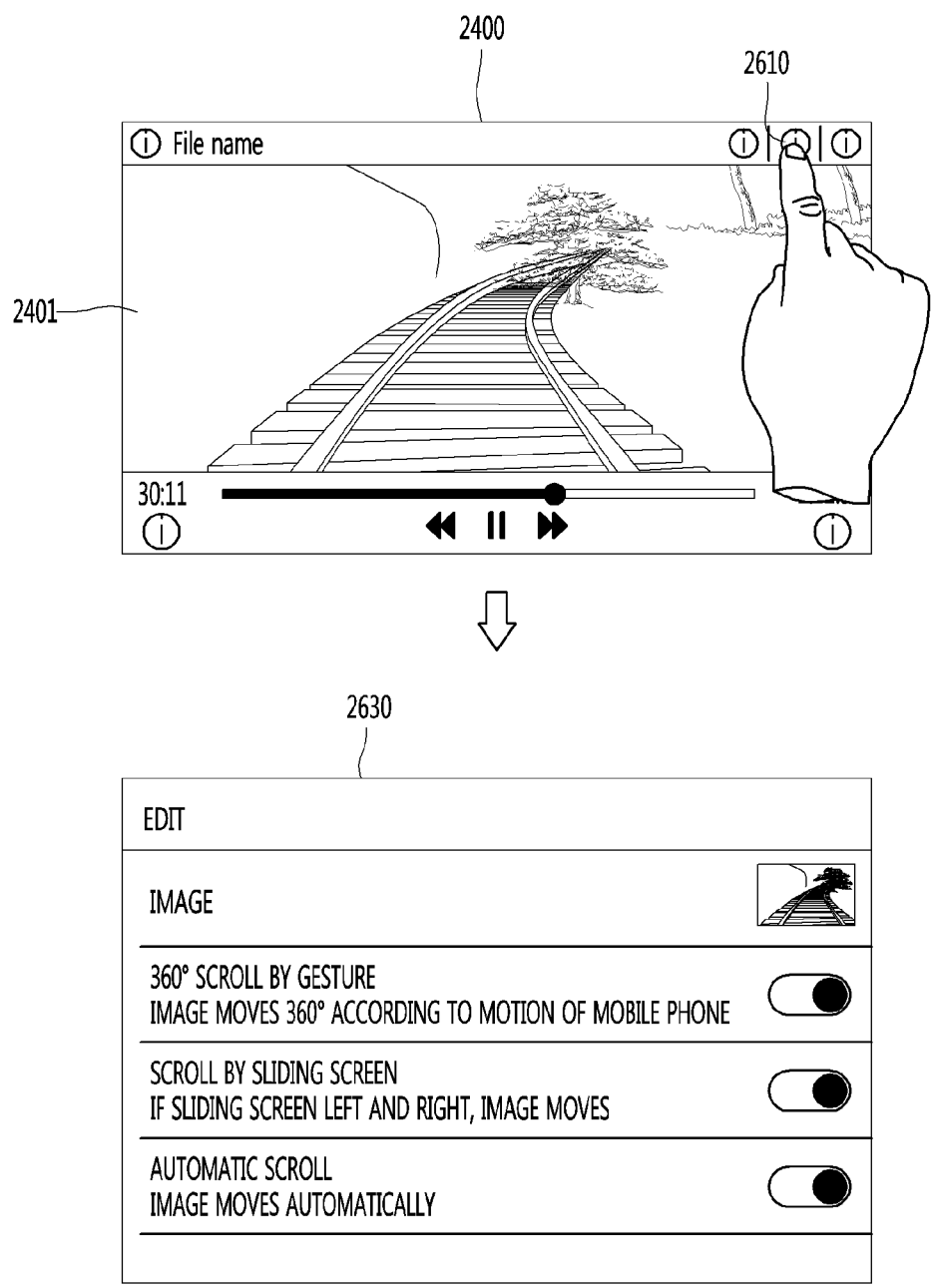

Referring to FIG. 26, the execution screen 2400 of the video application may further include an edit icon 2610. When the edit icon 2610 is selected, the controller 180 may display an edit screen 2630 for editing an omni-directional moving image 2401.

Menus capable of scrolling the omni-directional moving image in various ways may be included on the edit screen 2630.

Figure 27:
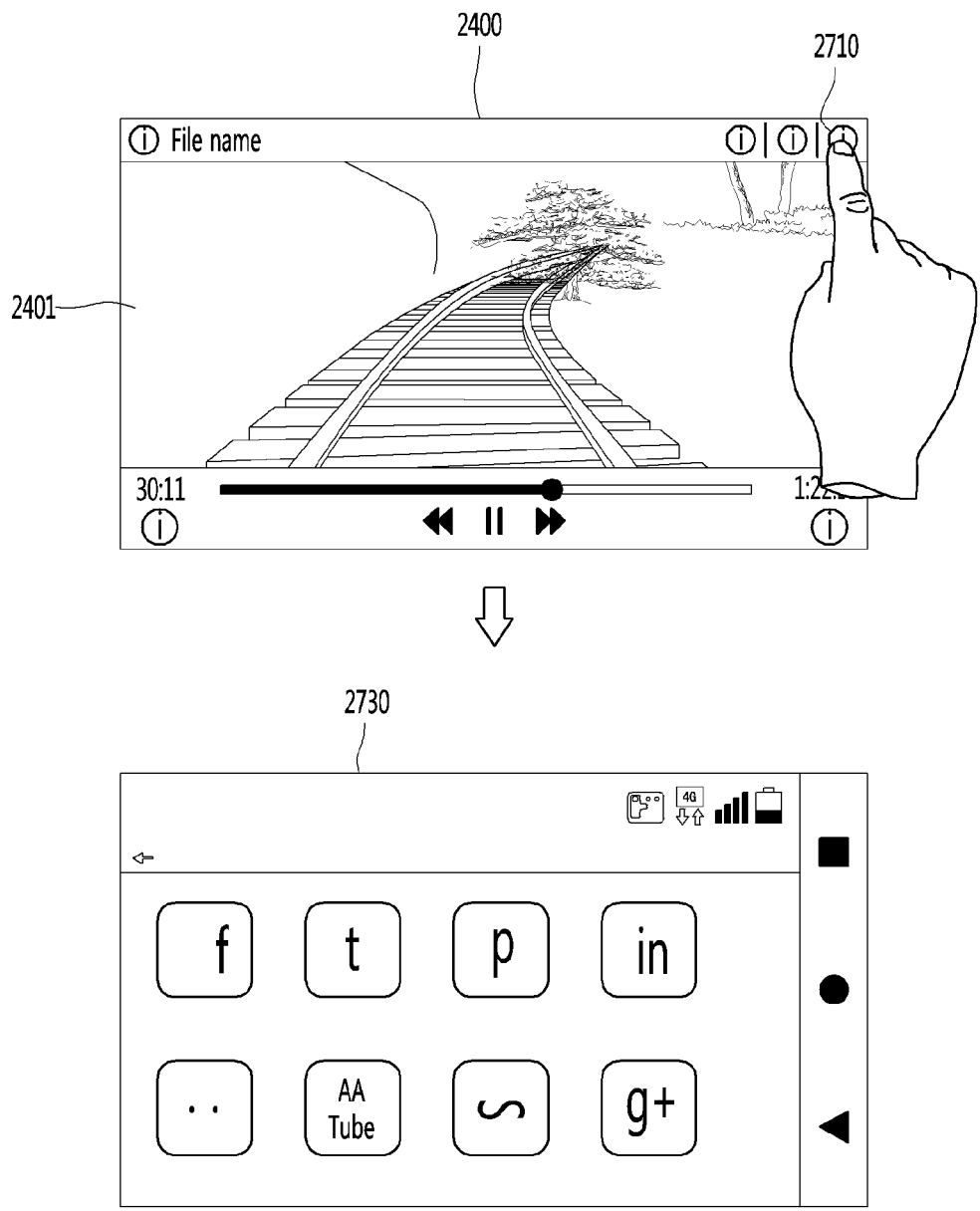

Referring to FIG. 27, the execution screen 2400 of the video application may further include a download icon 2710.

When the download icon 2710 is selected, the controller 180 may display a download application list 2730 including a plurality of content provider applications corresponding to a plurality of content providers which provide omni-directional moving images. When one of the applications included in the download application list 2730 is selected, the controller 180 may access the content provider corresponding to the selected application and download the omni-directional moving image.

Figure 28:
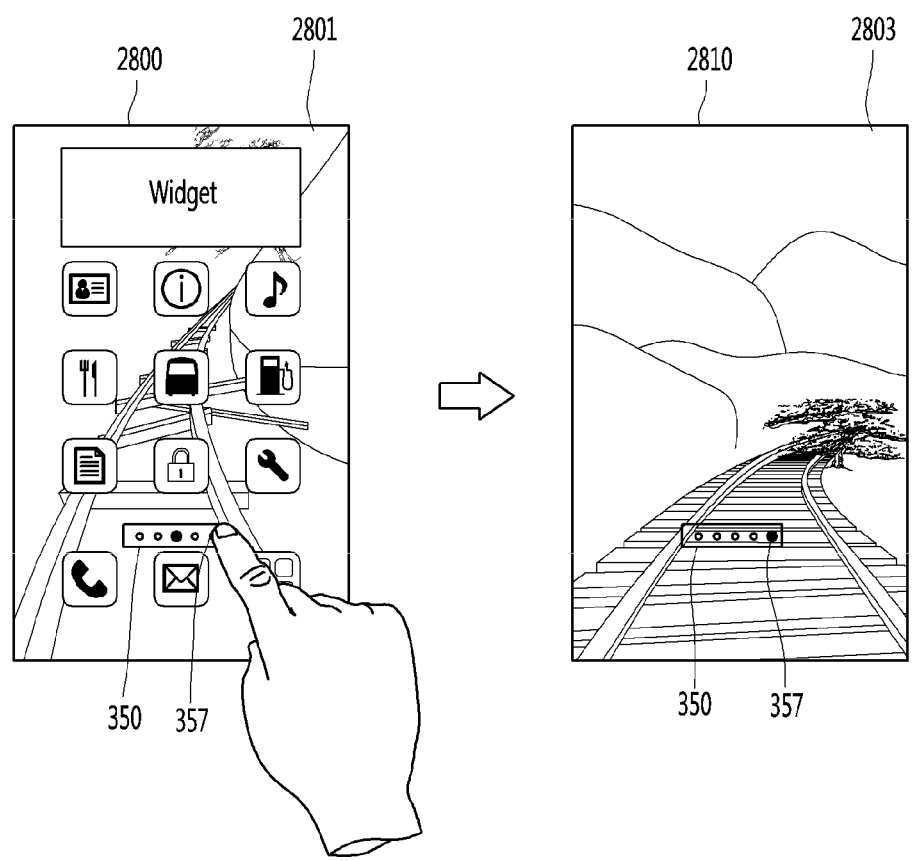
FIG. 28 is a view for describing an example of controlling reproduction of an omni-directional moving image displayed on a home screen through a page indicator in accordance with an embodiment of the present disclosure.

FIG. 28 is a view for describing an example of controlling reproduction of an omni-directional moving image displayed on a home screen through a page indicator in accordance with an embodiment of the present disclosure.

Referring to FIG. 28, an omni-directional moving image 2801 is registered as an image of a background screen included in a home screen 2800. The home screen 2800 may further include a page indicator group 350. A page indicator 357 included in the page indicator group 350 may be used to move a reproduction section of the omni-directional moving image 2801.

For example, when a particular page indicator 357 included in the page indicator group 350 is selected for a period of time, the controller 180 may move a reproduction time point of an omni-directional moving image 2803 30 seconds later.

The user can easily move the reproduction section of the omni-directional moving image displayed on the home screen.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

The invention claimed is:

1. A mobile terminal comprising:
a touch screen configured to display a home screen including a background screen and an item screen superimposed on the background screen, wherein a still image corresponding to a specific time point of an omni-directional moving image is displayed on the background screen; and
a controller configured to:
when a clean view entry request is received, remove the item screen and reproduce the omni-directional moving image from the specific time point in response to the received clean view entry request,
wherein the controller is further configured to:
determine whether a reserved viewing time of a streaming omni-directional moving image has passed, and
switch the still image to the streaming omni-directional moving image when the reserved viewing time has passed.

2. The mobile terminal according to claim 1, wherein the controller is configured to receive a reproduction stop request for stopping the reproduction of the omni-directional moving image and set the still image of the omni-directional moving image as an image of the background screen in response to the received reproduction stop request.

3. The mobile terminal according to claim 2, wherein the controller is configured to display the home screen including the item screen and the background screen set as the still image in response to the reproduction stop request.

4. The mobile terminal according to claim 3, wherein the still image of the omni-directional moving image is a spherical image, and
wherein the controller is configured to switch a partial image of the still image in a specific direction according to passage of time.

5. The mobile terminal according to claim 1, wherein, when a setting request for setting an image of the background screen is received, the controller is configured to display a spherical preview region and a content list region for providing a plurality of contents.

6. The mobile terminal according to claim 5, wherein, when one of the plurality of contents is selected, the controller is configured to display an omni-directional image of the selected content on the preview region.

7. The mobile terminal according to claim 1, wherein the controller is configured to:
when a home screen editing request is received, display an integrated home screen view including reduced home screens obtained by reducing each of a plurality of home screens; and
delete the home screen corresponding to the selected reduced home screen among the plurality of reduced home screens, or play an omni-directional moving image corresponding to the selected reduced home screen.

8. The mobile terminal according to claim 1, wherein the controller is configured to:
further display a page indicator group including page indicators corresponding to a plurality of home screens; and
when one of the page indicators is selected, reproduce an omni-directional moving image set as the background screen of the home screen corresponding to the selected page indicator.

9. The mobile terminal according to claim 1, wherein the controller is configured to, when a touch input is received for a predetermined time or longer through the touch screen during the reproduction of the omni-directional moving image and a drag input in a left or right direction is received, move a reproduction section of the omni-directional moving image.

10. The mobile terminal according to claim 1, wherein the controller is configured to, when a touch input is received for a predetermined time or longer through the touch screen during the reproduction of the omni-directional moving image and a drag input in an upper or lower direction is received, adjust a volume or brightness of the omni-directional moving image.

11. The mobile terminal according to claim 1, wherein, when the mobile terminal is rotated by 90 degrees during the reproduction of the omni-directional moving image, the controller is configured to reproduce the omni-directional moving image on an execution screen of a video application.

12. A method for operating a mobile terminal, the method comprising:
displaying a home screen including a background screen and an item screen superimposed on the background screen, wherein a still image corresponding to a specific time point of an omni-directional moving image is displayed on the background screen; and
when a clean view entry request is received, removing the item screen and reproducing the omni-directional moving image from the specific time point in response to the received clean view entry request,
wherein the method further comprises:
determining whether a reserved viewing time of a streaming omni-directional moving image has passed; and switching the still image to the streaming omni-directional moving image when the reserved viewing time has passed.

13. The method according to claim 12, further comprising, when a reproduction stop request for stopping the reproduction of the omni-directional moving image is received, setting the still image of the omni-directional moving image as an image of the background screen in response to the received reproduction stop request.

14. The method according to claim 13, further comprising:
- displaying the home screen including the item screen and the background screen set as the still image in response to the reproduction stop request; and
- switching a partial image of the still image having a spherical shape in a specific direction according to passage of time.

* * * * *